US012572606B2

(12) United States Patent
Boyce et al.

(10) Patent No.: US 12,572,606 B2
(45) Date of Patent: Mar. 10, 2026

(54) AUTOMATIC DOCUMENT NEGOTIATION

(71) Applicant: ISG Information Services Group Americas, Inc., Stamford, CT (US)

(72) Inventors: Christopher D. Boyce, San Francisco, CA (US); Paul N. Fahn, Sunnyvale, CA (US); Peter A. Graham, San Francisco, CA (US)

(73) Assignee: ISG Information Services Group Americas, Inc., Stamford, CT (US)

( * ) Notice: Subject to any disclaimer, the term of this patent is extended or adjusted under 35 U.S.C. 154(b) by 0 days.

(21) Appl. No.: 18/804,627

(22) Filed: Aug. 14, 2024

(65) Prior Publication Data

US 2024/0403372 A1      Dec. 5, 2024

Related U.S. Application Data

(63) Continuation of application No. 17/165,722, filed on Feb. 2, 2021, now Pat. No. 12,067,060, which is a
(Continued)

(51) Int. Cl.
*G06F 16/93*          (2019.01)
*G06N 20/00*          (2019.01)
*G06Q 50/18*          (2012.01)

(52) U.S. Cl.
CPC .............. *G06F 16/93* (2019.01); *G06N 20/00* (2019.01); *G06Q 50/188* (2013.01)

(58) Field of Classification Search
None
See application file for complete search history.

(56) References Cited

U.S. PATENT DOCUMENTS 8,756,117 B1 *  6/2014  Ballaro ................ G06Q 10/087
                                                    705/26.1
10,936,672 B2    3/2021  Boyce et al.
(Continued)

OTHER PUBLICATIONS

Economic valuation as acceptance metric for credit contracts (Year: 2016).*
(Continued)

*Primary Examiner* — Kim T Nguyen
(74) *Attorney, Agent, or Firm* — Hipp Law

(57)          ABSTRACT

Approaches provide for generating a document (e.g., a contract) that satisfies constraints of at least one party in negotiation. Information can be obtained from parties seeking to negotiate document sections (e.g., clauses or provisions) of a document such as a contract. Ranking values for a plurality of candidate contracts can be determined based on information from the parties, including their preferences for different sections (e.g., provisions) of the contract. The values can be used to optimize an optimization function that measures the degree to which candidate contracts satisfy the information provided by the parties. For example, an optimization technique, machine learning-based technique, or other appropriate technique can be utilized to determine a document or document information that satisfies the constraints of the parties. Thereafter, a contract can be selected and presented to the parties. The parties can execute the contract, modify, store, or otherwise interact with and/or process the contract.

20 Claims, 14 Drawing Sheets

Related U.S. Application Data continuation of application No. 16/283,557, filed on Feb. 22, 2019, now Pat. No. 10,936,672.

(60) Provisional application No. 62/636,647, filed on Feb. 28, 2018.

(56)                    References Cited

U.S. PATENT DOCUMENTS

| | | | |
|---|---|---|---|
| 11,070,505 B2 | 7/2021 | Han et al. | |
| 11,157,490 B2 | 10/2021 | Zhu et al. | |
| 11,341,257 B1 | 5/2022 | Cohen et al. | |
| 11,360,979 B2 | 6/2022 | Teen | |
| 11,429,350 B1 | 8/2022 | Venkatachalam et al. | |
| 11,582,181 B2 | 2/2023 | Han et al. | |
| 11,709,586 B2 | 7/2023 | Wilde et al. | |
| 11,756,544 B2 | 9/2023 | Sharifi et al. | |
| 11,768,884 B2 | 9/2023 | Benincasa et al. | |
| 11,853,700 B1 | 12/2023 | Funk et al. | |
| 11,921,767 B1 | 3/2024 | Chang et al. | |
| 2003/0074244 A1* | 4/2003 | Braxton | G06Q 50/06 |
| | | | 702/183 |
| 2008/0039189 A1* | 2/2008 | Walker | G06Q 30/06 |
| | | | 463/25 |
| 2010/0257162 A1 | 10/2010 | Buron et al. | |
| 2011/0125734 A1 | 5/2011 | Duboue et al. | |
| 2012/0197876 A1 | 8/2012 | Morris et al. | |
| 2013/0110828 A1 | 5/2013 | Meyerzon et al. | |
| 2014/0074881 A1 | 3/2014 | Meyerzon et al. | |
| 2014/0278814 A1 | 9/2014 | Stallman et al. | |
| 2017/0098291 A1* | 4/2017 | Code | G06Q 40/02 |

| | | | |
|---|---|---|---|
| 2017/0193619 A1* | 7/2017 | Rollins | G06Q 50/184 |
| 2018/0308184 A1 | 10/2018 | Pankanti et al. | |
| 2019/0266196 A1 | 8/2019 | Boyce et al. | |
| 2021/0157862 A1 | 5/2021 | Boyce et al. | |
| 2021/0342836 A1* | 11/2021 | Cella | G06Q 30/0208 |
| 2022/0172206 A1* | 6/2022 | Cella | G06N 3/049 |
| 2022/0172207 A1* | 6/2022 | Cella | G06N 3/065 |
| 2022/0172208 A1* | 6/2022 | Cella | G06N 3/065 |
| 2022/0366494 A1* | 11/2022 | Cella | H04L 9/3231 |
| 2023/0016576 A1 | 1/2023 | Wilde et al. | |
| 2023/0342166 A1 | 10/2023 | DeNeui et al. | |
| 2023/0418883 A1 | 12/2023 | Pickens et al. | |
| 2023/0419026 A1 | 12/2023 | Pickens et al. | |
| 2024/0086790 A1* | 3/2024 | Clark | G06Q 30/0202 |
| 2024/0403372 A1* | 12/2024 | Boyce | G06Q 50/188 |
| 2025/0272724 A1* | 8/2025 | Cella | G06N 3/092 |
| 2025/0299255 A1* | 9/2025 | Cella | G06Q 40/04 |

OTHER PUBLICATIONS

An Application of Linear Programming in Performance Evaluation (Year: 2017).*

Notice of Allowance, "Notice of Allowance dated Apr. 22, 2021," U.S. Appl. No. 16/283,557, filed Feb. 22, 2019, 10 Pages.

Office Action, "Non-final Office Action dated Sep. 3, 2020," U.S. Appl. No. 16/283,557, filed Feb. 22, 2019, 13 pages.

Notice of Allowance, "Notice of Allowance dated Jul. 10, 2024," U.S. Appl. No. 17/165,722, filed Feb. 2, 2021, 11 Pages.

Office Action, "Non-final Office Action dated Mar. 25, 2022," U.S. Appl. No. 17/165,722, filed Feb. 2, 2021, 18 pages.

* cited by examiner

200

202

First Party

203
Preference Information

207    Setting    Priority    209

204

Second Party

205
Preference Information

211    Setting    Priority    213

Negotiation Engine

Ranking Component

230

228

214
Candidate Document

Third Party Providers

210

300

309

308

302

304

Testing
Module

Training
Module

Neural
Network

306

310

Training
Documents

314

Input Document

Classifier

312

Classification(s)

316

502 — Obtain a set of documents

504 — Determine whether document sections correspond to a determined category

506 — Attribute?

Yes

No

508 — Training set?

510 — Exclude from training set

512 — Full Set?

514 — Store documents for training and other purposes

500

602
Obtain training data

604
Train classification layers of a neural network on the training data for one or more classifications

605
Complete?

No

609

Yes

608
Test neural network using remaining portion of training data

610
Provide the trained neural network for use in classifying audio data

1100

1102

Obtain a plurality of candidate documents

1104

Threshold met?

Yes

1104

Process the plurality of candidate documents

No

1108

Select a candidate document based on one of preference information, relationship information, ranking scores, or document type

AUTOMATIC DOCUMENT NEGOTIATION

CROSS REFERENCE TO RELATED APPLICATIONS

This application is a continuation of U.S. application Ser. No. 17/165,722, entitled "AUTOMATIC DOCUMENT NEGOTIATION," filed Feb. 2, 2021, which is a continuation of U.S. application Ser. No. 16/283,557, now U.S. Pat. No. 10,936,672, entitled "AUTOMATIC DOCUMENT NEGOTIATION," filed Feb. 22, 2019, which claims priority to U.S. provisional application No. 62/636,647, filed Feb. 28, 2018, and entitled "SYSTEM FOR MULTIPARTY AUTOMATED CONTRACT NEGOTIATION," which the full disclosure of these applications is incorporated herein by reference for all purposes.

BACKGROUND

As the number of users electronically viewing and searching for documents increases, there is a corresponding increase in the number of document search, creation, and storage services. In conventional services, users can download document templates which can be modified as desired by the user. In some situations, a user can provide user-specific information which can be used to create a document that incorporates the information. These documents and other such documents can often be stored, shared, searched, and/or modified using these services.

In many cases, however, a user may be searching for a document to use in a particular situation, such as a business setting where the user seeks a particular document such as a nondisclosure agreement to protect against unwittingly disclosing information on an idea or invention. Although a user in some instances may be able to search for document templates, and modify the template, in many cases the document template may not be tailored to a user's particular situation.

Further, document search, creation, and storage services do not appear to automatically negotiate and generate a document (e.g., a contract) that attempts to balance the preferences of parties to a contract. Instead, conventional approaches use either offline methods (e.g., paper-and-ink versions of a contract or of a term sheet outlining critical provisions of a contract), or digital document applications (such as Microsoft Word) that are capable of tracking changes, including highlighting and comments, and displaying changes by each party in red or other colors. This latter method, commonly called "redlining," requires the parties to a proposed contract to send electronic versions of the proposed contract back and forth between parties, modify proposed contract language or terms, add or remove comments, and so on. Voice calls or even face-to-face meetings may also supplement these document exchanges.

The redlining process is time-consuming and often expensive. Consequently, users are typically limited to default document templates, which may not cover their particular situation or at least not optimally reflect the interest of parties involved. A need exists, therefore, for systems, methods, and devices that overcome this disadvantage.

BRIEF DESCRIPTION OF THE DRAWINGS

Various embodiments in accordance with the present disclosure will be described with reference to the drawings, in which.

DETAILED DESCRIPTION

Figure 1:
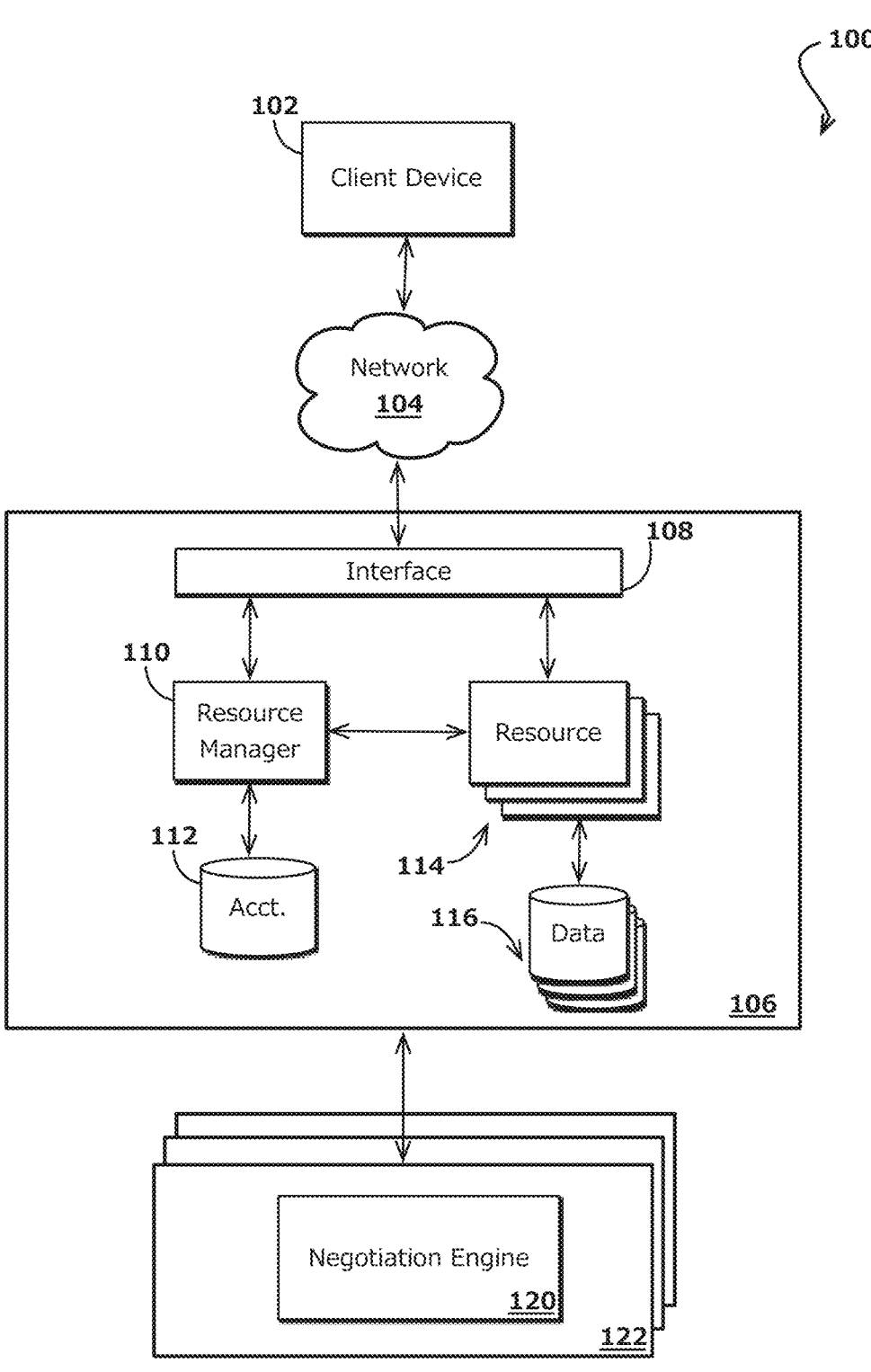
FIG. 1 illustrates an example environment in which aspects of the various embodiments can be implemented.

Systems and methods in accordance with various embodiments of the present disclosure may overcome one or more of the aforementioned and other deficiencies experienced in conventional approaches to generating and/or selecting content in an electronic environment. In particular, various embodiments describe systems and methods to automatically generate or otherwise determine a document (e.g., a contract) or document information that satisfies constraints of at least one party in a negotiation.

For example, a document negotiation component can obtain preference information for a document from parties seeking to negotiate document sections (e.g., clauses or provisions) of the document (e.g., contract). In an embodiment, the document negotiation component, or component(s) in communication thereof, can generate a ranking value or other such document selection value or score for a plurality of candidate contracts possible between the parties based on information from the parties, including their preferences and priority ranking for different sections (e.g., provisions) of the contract. As described further herein, the ranking value can be a combination or function of a set of document section ranking values or other similar values that quantify a likelihood of a setting for a candidate document section satisfying preference information associated with a party. The document negotiation component can, for example, use the document section ranking values to optimize an optimization function (e.g., a cost function or other such function) to determine ranking values for the plurality of candidate contracts, where a ranking value measures the degree to which a candidate contract satisfies the preference information associated with a particular party. A contract from the plurality of candidate contracts can be selected based on respective ranking values for the candidate contracts, and presented or otherwise provided to the parties. Thereafter, the parties can execute the contract, modify, store, or otherwise interact with and/or process the contract.

Instructions for causing a computer system to perform automated document negotiation in accordance with the present disclosure may be embodied on a computer-readable medium. For example, in accordance with an embodiment, a backend system may automatically obtain information from parties seeking to negotiate document sections of a document such as a contract. The system can generate a ranking value or other such document selection value or score for a plurality of candidate contracts possible between the parties based on information from the parties, including their preferences and priority ranking for different sections (e.g., provisions) of the contract. As described further herein, the ranking value can be a combination or function of a set of document section ranking values or other similar values that quantify a likelihood of a setting for a candidate document section satisfying preference information associated with a party. The system can, for example, use the document section ranking values to optimize an optimization function (e.g., a cost function or other such function) to determine ranking values for the plurality of candidate contracts, where a ranking value measures the degree to which a candidate contract satisfies the preference information associated with a particular party. A contract from the plurality of candidate contracts can be selected based on respective ranking values for the candidate contracts and presented or otherwise provided to the parties. Thereafter, the parties can execute the contract, modify, store, or otherwise interact with and/or process the contract Embodiments provide a variety of advantages. For example, in accordance with various embodiments, automatic document negotiation can be utilized by any system that attempts to optimize inputs and resources including computing system resources. The systems can include, for example, document creating services, agreement negotiation services, consumer bidding platforms, and other electronic environments that enable a user to negotiate the terms of an agreement or other such interaction. In accordance with various embodiments, by providing a system that automatically balances preferences and resources, the system can more efficiently and quickly form an agreement between parties. For example, contracts generated in accordance with approaches described herein will more likely be acceptable to all the parties to the contract, and thus more likely to produce a successfully signed and executed contract than conventional electronic systems.

Further, the amount of time, computing and other such resources used to generate a contract acceptable to all parties can be decreased. Further still, resources and preferences can be reasonably balanced in an expedient manner, which can reduce cost, system resources, and time in negotiating a contract between parties, which based on convention approaches may otherwise lead to a lengthy negotiation requiring multiple rounds of negotiation and ultimately result in a contract that is not fairly balanced. Further still, approaches can reduce costs to parties as the contract negotiation process may require less time with other professionals, such as attorneys and the like who often charge by time worked. In this way, the amount of time to negotiate a contract can be reduced, which can result in the reduction in the amount of fees payable to such professionals. In other such situations, reducing professional time and resources may allow those professionals to perform other tasks, which can allow for an optimal distribution of resources.

Various other functions and advantages are described and suggested below as may be provided in accordance with the various embodiments.

FIG. 1 illustrates an example environment 100 in which aspects of the various embodiments can be implemented. It should be understood that reference numbers are carried over between figures for similar components for purposes of simplicity of explanation, but such usage should not be construed as a limitation on the various embodiments unless otherwise stated. In this example, a user can utilize a client device 102 to communicate across at least one network 104 with a resource provider environment 106. The client device 102 can include any appropriate electronic device operable to send and receive requests, messages, or other such information over an appropriate network and convey information back to a user of the device. Examples of such client devices 102 include personal computers, tablet computers, smartphones, notebook computers, and the like.

The network(s) 104 can include any appropriate network, including an intranet, the Internet, a cellular network, a local area network (LAN), or any other such network or combination, and communication over the network can be enabled via wired and/or wireless connections.

The resource provider environment 106 can include any appropriate components for receiving requests and returning information or performing actions in response to those requests. As an example, resource provider environment 106 might include Web servers and/or application servers for receiving and processing requests, then returning authentication scores, data, Web pages, video, audio, or other such content or information in response to the request. While this example is discussed with respect to the internet, web services, and internet-based technology, it should be understood that aspects of the various embodiments can be used with any appropriate services available or offered over a network in an electronic environment.

In various embodiments, resource provider environment 106 may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. Methods for enabling a user to reserve various resources and resource instances are well known in the art, such that detailed description of the entire process, and explanation of all possible components, will not be discussed in detail herein. In this example, resource provider environment 106 includes a plurality of resources 114 of one or more types. These types can include, for example, application servers operable to process instructions provided by a user or database servers operable to process data stored in one or more data stores 116 in response to a user request.

In various embodiments, resource provider environment 106 may include various types of resources that can be utilized for document selection and creation. In this example, resource provider environment 106 includes a management component (not shown) operable to manage a negotiation engine 120 or other such document negotiation component. The management component may be hosted on multiple server computers and/or distributed across multiple systems. Additionally, the components may be implemented using any number of different computers and/or systems. Thus, the components may be separated into multiple services and/or over multiple different systems to perform the functionality described herein.

In various embodiments, the resources 114 can take the form of servers (e.g., application servers or data servers) and/or components installed in those servers and/or various other computing assets. In some embodiments, at least a portion of the resources can be "virtual" resources supported by these and/or components. While various examples are presented with respect to shared and/or dedicated access to disk, data storage, hosts, and peripheral devices, it should be understood that any appropriate resource can be used within the scope of the various embodiments for any appropriate purpose, and any appropriate parameter of a resource can be monitored and used in configuration deployments.

In at least some embodiments, an application executing on the client device 102 that needs to access resources of the provider environment 106, for example, to manage negotiation engine 120, implemented as one or more services to which the application has subscribed, can submit a request that is received to interface layer 108 of the provider environment 106. The interface layer 108 can include application programming interfaces (APIs) or other exposed interfaces enabling a user to submit requests, such as Web service requests, to the provider environment 106. Interface layer 108 in this example can also include other components as well, such as at least one Web server, routing components, load balancers, and the like. When a request to access a resource is received at the interface layer 108 in some embodiments, information for the request can be directed to resource manager 110 or other such systems, service, or component configured to manage user accounts and information, resource provisioning and usage, and other such aspects. Resource manager 110 can perform tasks such as to communicate the request to a management component or other control component which can manage distribution of configuration information, configuration information updates, or other information for host machines, servers, or other such computing devices or assets in a network environment, authenticate an identity of the user submitting the request, as well as to determine whether that user has an existing account with the resource provider, where the account data may be stored in at least one data store 112 in the resource provider environment 106. The resource manager can in some embodiments authenticate the user in accordance with embodiments described herein based on voice data provided by the user.

An interface layer 108 in at least one embodiment includes a scalable set of customer-facing servers that can provide the various APIs and return the appropriate responses based on the API specifications. Interface layer 108 also can include at least one API service layer that in one embodiment consists of stateless, replicated servers which process the externally-facing customer APIs. The interface layer can be responsible for Web service front-end features such as authenticating customers based on credentials, authorizing the customer, throttling customer requests to the API servers, validating user input, and marshaling or unmarshaling requests and responses. The API layer also can be responsible for reading and writing database configuration data to/from the administration data store, in response to the API calls. In many embodiments, the Web services layer and/or API service layer will be the only externally visible component or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

A host machine 122 in at least one embodiment can host the negotiation engine 120. In accordance with various embodiments, negotiation engine 120 can obtain information from parties seeking to negotiate document sections (e.g., clauses or provisions) of a document such as a contract. In an embodiment, the document negotiation component, or component(s) in communication thereof, can generate a ranking value or other such document selection value or score for a plurality of candidate contracts possible between the parties based on information from the parties, including their preferences and priority ranking for different sections (e.g., provisions) of the contract. As described further herein, the ranking value can be a combination or function of a set of document section ranking values or other similar values that quantify a likelihood of a setting for a candidate document section satisfying preference information associated with a party. The document negotiation component can, for example, use the document section ranking values to optimize an optimization function (e.g., a cost function or other such function) to determine ranking values for the plurality of candidate contracts, where a ranking value measures the degree to which a candidate contract satisfies the preference information associated with a particular party. A contract from the plurality of candidate contracts can be selected based on respective ranking values for the candidate contracts and presented or otherwise provided to the parties. Thereafter, the parties can execute the contract, modify, store, or otherwise interact with and/or process the contract.

It should be noted that although host machine 122 is shown outside the provider environment, in accordance with various embodiments, negotiation engine 120 can both be included in provider environment 106, while in other embodiments, one or the other can be included in the provider environment.

As mentioned, however, although conventional approaches to document creation and/or modification typically allow for a degree of customization of a document, such approaches fall short of reliably producing documents such as a contract that are satisfactory to a specific legal situation. The contracts produced by conventional approaches reflect the preferences of one of the multiple parties involved. As such, these approaches are unlikely to be satisfactory to all parties, and ensuing rounds of negotiations are still required.

Further, existing contract negotiations are slow and time-consuming, frequently involving many rounds of back-and-forth exchange of proposed terms, comments, document edits, calls and meetings, and so on. It is common for these negotiations to last weeks or months. Even in the situation where one party uses an online service to produce a candidate contract, that contract is only the opening offer in a back-and-forth process of sending revised document between the parties.

Further still, existing contract negotiations are often expensive, since one or more parties may employ dedicated legal professionals to review and comment on each round, and to produce the edits or new language for each subsequent round of negotiation. Even aside from the use of legal professionals, the lengthy time required for legal negotiation imposes costs due to the delay of the underlying business transaction embodied by the contract.

In accordance with various embodiments, approaches described herein automatically generate or otherwise determine a document (e.g., a contract) or document information that satisfies constraints of at least one party in a negotiation.

Figure 2:
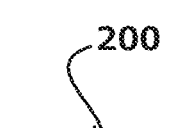
FIG. 2 illustrates an example system for document negotiation in an electronic environment in accordance with various embodiments.

FIG. 2 illustrates an example system 200 for document negotiation in an electronic environment in accordance with various embodiments. In this example, negotiation engine 228 can be used to automatically generate a document (e.g., a contract) that satisfies constraints of two or more parties. Negotiation engine 228 can include or be in communication with at least a ranking component 230.

In this example, two parties, 202 and 204, desire to create a document (e.g., a contract) to implement a business transaction or partnership of some sort. The parties can be users of a content negotiation service, content or document generation service, or other such services. It should be understood that the document can be one of any number of documents, including, for example, land contracts, sale of goods contracts, nondisclosure agreement, non-compete agreements, engagement contracts, service provider and vendor contracts, construction and renovation contracts, ongoing maintenance contracts, education and academia contracts, finance and business contracts, workplace contracts, real estate contracts, among other such contracts. It should be further understood that a party to a contract can be a company, government agency, or other recognized entity, an individual person, or a group of people. Example entities include, for example, a C Corporation (either publicly or privately owned), an S Corporation, a partnership, a sole proprietorship, a limited liability corporation, or any other type of entity with the right to enter into a legal contract.

In accordance with an embodiment, party 202 can represent the first party, and party 204 can represent the second party. The actual users of the system are authorized representatives of the two parties (if the parties are companies or other entities with multiple partners or employees) or maybe the parties themselves (if the parties are persons or single-party entities such sole proprietorships).

In accordance with an embodiment, negotiation engine 228 obtains preference information 203 from first party 202 and preference information 205 from second party 204. The information can include, for example, setting information for a contract or other such document and priority information. In an embodiment, preference information typically relates to specific document sections (e.g., clauses or provisions) of a document, but possibly also other items such as the effective date of the document, the purpose of the document, monetary value (e.g., salary in an employment contract, purchase price in a purchase agreement contract), etc.

The sections of the document for which preference information is gathered may be selected by negotiation engine 228, by first party 202 or second party 204, or by some other entity such as someone who has sufficient expertise to select document sections likely to be negotiated by the parties.

The sections of the document ("document sections") for which preference information can constitute, in aggregate, a subset of the document, because there are typically parts of the document whose language is more or less standardized and usually not a subject of active negotiation. In some embodiments, available document sections can be included when the parties are asked to submit preference information. The number of document sections for which preference information is gathered can vary by document type and per the choices made by whichever party selects the document sections. Document sections can include, for example, a preamble, recital, words of agreement section; a definitions section; an action (consideration) section; a representation and warranties section; a covenants and rights section; a conditions to obligations section; a provisional and remedies section; a general provisions section; a signatures section; a sentence, phrase, or word of the document; multiple sentences, phrases, words, or other document sections that are related, among other such sections or a document. Sections can be related, for example, by topic, subject matter, or other reference category.

The preference information associated with individual parties of the document can be generally grouped into two categories. The first category includes the content (or "setting") of the document section that is preferred by each party. The second category includes the relative importance (or "priority") that each party places on the section. As shown in FIG. 2, preference information 203 includes content setting information 207 and priority information 209. Preference information 205 includes content setting information 211 and priority information 213.

In accordance with various embodiments, the preference information can be requested from the parties either sequentially (e.g., first ask for the settings, then the priority rating, or vice versa) or in parallel (e.g., as a list of questions on an interface, which can be answered in any order).

Preference information 203 and 205 can be in any form appropriate for the document section. For example, for an effective date or expiration date of the document, a party could enter a date or a range of dates. For a section with a well-defined set of content options, as seen in similar documents, a party may select one of those common options. For example, in the case of a document type whose term is commonly set to 1, 2, or 3 years, first party 202 and second party 204 can choose preference information 203 and 205 respectively, among those options. First party 202 and second party 204 in some embodiments can be prompted to enter another period of time. As another example, a document may have a section concerning the legal remedies of one party against another party in case of a breach of contract. In the situation where there are three variations of the legal language in this "Remedies" section, the parties may be shown these three variations as possible settings for the Remedies section and prompted to indicate their preferred setting.

In accordance with various embodiments, the parties may be able to edit submitted settings or to submit or write another version of the section as their preferred setting. Negotiation engine 228 may label the three settings with a short label or a user-friendly nickname that indicates some qualitative features of the settings. For example, the three options for the Remedies section could be labeled "Narrow Remedies," "Medium Remedies," and "Extensive Remedies." Such short labels could be helpful to the parties' understanding of the differences between the optional settings for a particular section. A plain English explanation can be presented in certain embodiments for the document sections.

For more open-ended document sections, for example, a section stating the business purpose of a contract, the parties would typically be able to enter any text of their choosing, although the parties may also be presented with some pre-written options that represent settings commonly selected by parties to similar documents.

Setting information 207 and 211 may include multiple settings for a particular document section. For example, first party 202 and second party 204 may be prompted not only for its first choice of content (setting) for each of the document sections, but also its second choice, or even its third or more choices.

In certain embodiments, a party to a document may not have a preference for a particular document section where they are asked for a preference. There are various reasons this could happen, such as the party considers all the options for that section to be equally preferable, the party has decided to allow a different party to the document to choose the setting for that section, the party simply does not believe that the section in question is important to the purpose or performance of the document, among other such reasons.

In this example, one or both parties may be able to mark its preference for a particular section as "no preference," "defer to other party," or something similar. In an embodiment, this could result in that section being created in accordance with the preference of another party. In the situation where all parties decline to state a preference, negotiation engine 228 can produce candidate document 214 with a "standard," "default," or most commonly accepted setting for that section of the document. In another example, negotiation engine 228 may choose to require one or all parties to indicate a preferred setting, to produce a candidate document most appropriate to the particular goals and concerns of the parties involved.

In accordance with various embodiments, content setting information may be shared between parties or selected party members. For example, setting information 207 may be shared with second party 204. In some embodiments, the setting information may be confidential, or the sharing of such information delayed for a predetermined period of time.

Priority information 209 and 213 can include or be associated with a priority indication, or a level of importance, for some document sections, typically consisting of most or all of the sections for which the parties are asked for their preferred settings.

In accordance with various embodiments, the importance a party places on a document section can be understood in a relative sense. That is, relative to the importance a party places on other sections of the document, and relative to the importance placed by other parties on the same section. In an embodiment, based on how the priority information is indicated by the parties, the priority information may be normalized to make the priority information comparable to other sections and other parties.

There are many possible formats in which priority information may be received for the individual document sections. For example, individual parties may be prompted to indicate the importance placed on each section by choosing a number from 1 to 10. In this example, a value of 1 can indicate a low level of importance, and a value of 10 can indicate a high level of importance. In another example, individual parties can be prompted to order document sections from, for example, most to least important or least to most important. If there are 6 sections listed, for example, the parties can be prompted to indicate the most important, the second most important, and so on down to the sixth, or least important. In yet another example, individual parties can be given a certain number of tokens to allocate among the document sections. In this example, allocating more tokens on a single section can indicate the higher importance a party places on that section. This is similar to some voting systems where voters are given multiple votes to "spend" among the candidates, and they can choose to spend multiple votes on a single candidate.

It will be apparent that there are many more possible ways for the parties to indicate the importance placed on each document section, beyond those in the examples listed above, and that there are many possible variations of each of the examples listed above.

In an embodiment, negotiation engine 228 can maintain priority information 209 and 213 a secret or otherwise confidential. Priority information 209 and 213 can be stored securely and may not be disclosed to parties without explicit permission to make such a disclosure by the party who submitted the priority information.

Once preference information 203 and 205 is obtained by negotiation engine 228, negotiation engine 228 and ranking component 230 can be configured to balance the preferences of first party 202 and second party 204 to determine candidate document 214, including, for example, a proposed document or document summary or term sheet. For example, as will be described further herein, based on preference information 203 and 205, as well as additional information, negotiation engine 228 can determine candidate document 214.

Additional information can include other information associated with first party 202 and second party 204 or information associated with one or more documents. The additional information may be obtained from one or more third-party providers, such as third-party providers 210. The additional information can be obtained at any point before the actual operation of negotiation engine 228, either before or after the preference information is obtained, in real-time during the operation of the negotiation engine 228, among other such times.

Additional information can include data useful to generate candidate document 214. For example, additional information can include historical preference data gathered from first party 202 and/or second party 204. This can include preference information for documents of the same type as the current document, with different counterparties, or documents of a different type (with either the same or different counterparties), where the preference information gathered correlates with the sections of the current document.

The additional information can include non-preference information provided by the parties. This can include, for example, a business address that was entered during a registration step (if any). Such an address could indicate a geographical area whose governing law is likely to be acceptable to that party since they already conduct business in that jurisdiction.

The information can include, for example, historical information associated with a party, which can indicate previously set section settings for a party. In an example, the historical information can indicate that a party has requested and/or accepted a 5-year term on contracts of a particular type. Negotiation engine 228 can utilize that information when determining a candidate document.

In another example, additional information can include publicly available information associated with one or more of the parties that could correlate with acceptable content for that party. Publicly available information can include information available on a party's web site, a party's SEC filing documents, blog posts related to the document subject, and so on.

In yet another example, additional information can include third party information on similar documents to the current document with other parties. In an embodiment, the third-party information can include preference information from other entities used to generate a candidate document similar to a current candidate document. In this example, the third-party information may correlate with content acceptable to current parties. For example, such data may indicate that a certain percentage of entities which are incorporated accept the State of Delaware's governing law. In another example, third party information may indicate that parties for whom "option A" is satisfactory in document "section 1" also usually find that "option B" in document "section 2" is also acceptable.

In yet another example, additional information can include industry information, social information, cultural information, geographic information, legal information, among other information. Industry information can include, for example, document information as it pertains to a particular industry. For example, in certain industries, it may be common for commercial leases to last for 24 months. Social and Cultural information can include, for example, information that one of the parties is a member of a social or cultural group, as known through their social media posts, blog posts, or other available information. If members of the group correlate with common or acceptable practices in legal contracting, such social or cultural information may be utilized by the negotiation engine 228. Geographic information can include, for example, information that indicates preferences of parties to a document. In an example, the geographic information may indicate that companies based in Rhode Island often prefer to have contract disputes adjudicated in Massachusetts. Legal information can include, for example, information about changes in contracting practices due to factors such as new laws and regulations, new trends among law firms and their clients, and newly issued court rulings. In an example, suppose a court rules that a non-compete clause contained in a particular employment agreement was invalid. The ruling could make such clauses less common in employment agreements and could be an input to negotiation engine 228.

Negotiation engine 228 and ranking component 230 determines candidate document 214 or the settings and other information for such a candidate document based on preference information 203 and 205, and the additional information from third-party providers 210.

In accordance with various embodiments, the set of possible candidate documents may be large, depending on the number of sections in the document that are variable, and the number of possible settings for each such section. In this way, each variable section of the document can be said (in a mathematical sense) to add a dimension to the solution space. For example, the solution space has high dimension if there are many variable sections of the document and low dimension of only a small number.

As will be described further herein, based on the set of inputs, negotiation engine 228 can determine one solution out of the set of possible candidate documents. Determining the solution can include, for example, the codification of the set of inputs, processing of the set of inputs to determine a solution, and conversion of the solution to document settings for sections of a candidate document.

In accordance with an embodiment, the document settings can include a list of document sections and their settings, or a term sheet for a document, listing the content of the key sections with text (e.g., legal wording) associated with a particular section, or any other format containing the proposed settings. In an embodiment, the document sections can overlap with the document sections for which preference information was obtained.

Additionally, or alternatively, negotiation engine 228 can generate candidate document 214. Candidate document 214 can include appropriate text for the document sections based on at least preference information 203 and 205 as well as additional information from third-party providers 210. In an embodiment, candidate document 214 can be a complete document, or particular sections of a document, or some similar variation that contains text, code, and/or other information to generate candidate document 214.

Candidate document 214 can be stored and subsequently accessed by the parties, for example, via an online platform where the parties can view and download candidate document 214 (or the list of settings for the candidate document which may be in a simple text-based format). In certain embodiments, the candidate document is available to authorized users, which may be fewer than the number of parties to the document. For example, a party member or other authorized user may be granted access right privileges authorizing the user to make the presentation or grant/deny accessibility of the candidate document to one or more party members or other users.

In accordance with various embodiments, the candidate document, or the settings for the candidate document, can be presented in a format that may use one or more graphical methods to convey information about the settings (content) in the candidate document and how those settings relate to the preferences of the parties.

For example, one such graphical method can use a color-coded display of the settings or document sections to indicate to one or more parties whether the setting of a document section in the candidate document matches that party's preference. The color could be displayed as a color of the font displaying the setting, the color of a bounding box or other container, the color of an icon associated with the document section or the setting thereof, or the color of some other graphical or textual element can be associated with the display of the document section or the setting (content) thereof.

The specific colors chosen can be selected by the negotiation engine. For example, the display of the section could be in green to indicate that the content (setting) of that section of the candidate document matches the preference of the viewing party. A section could be displayed in red in cases where the content of the document section of the candidate document does not match the party's preference. Thus, a party viewing the display of the candidate document would know at a glance, by seeing which sections are green and which are red, which and how many sections match its requested preference.

In accordance with an embodiment, the number of colors used in the display could vary. For example, five colors can be used to distinguish the "distance" between the party's requested preference for a document section and the actual content of that section in the candidate document that was generated.

A color-coded display of the settings or document sections can be used to indicate to one or more parties whether the content (setting) of each section of the candidate document matches the preference of one or both of the parties, or alternatively is a compromise between those preferences, not matching either of them. Thus, the colors indicate, for each section, whether the negotiation engine "favored" one party over another or was "neutral" between them. In an embodiment, a "neutral" situation, can occur, for example, when both parties have selected the same preference, or when the negotiation engine selects a third setting for a section, not matching either of the preferences of the parties.

In addition to the use of color, or instead of the use of color, other graphical methods can be used to indicate which party, if any, was "favored" in the various sections of the candidate document. For example, the display could use a linear slider with a marker at some point along it. The marker on the left (for example) could indicate a match to the preference of one party and a marker on the right can indicate a match to the preference of another party. A position of the marker in between the left and right indicates a setting not matching either party's preference. The position could further indicate the distance of the setting in the candidate document from the preferences of the two parties.

As another example, the display could show the image of manual weight scales, showing the scales tipped to one side or the other depending on whether a particular section of the candidate document "favors" one party or the other. For example, the image of the scale could be level (not tipped) if the section's content did not match either party's prefer-ence. In addition, colors could be used in conjunction with the scales, for example, displaying the scale itself in different colors, or the images of weights on the scales in different colors, to additionally indicate information about the set-tings of the sections in the candidate document.

In certain embodiments, the candidate document may not be acceptable to all the parties to the document. If the candidate document is not acceptable to all the parties, the parties can continue negotiation with each other, either mediated by the negotiation engine or directly with each other. It is also possible that one or more parties may decide to discontinue the negotiation process and no longer attempt to reach agreement on the document. If the candidate document is acceptable to all the parties, then the parties can proceed to sign the document. They can sign offline on hard copy (by printing the document and signing by hand), or by digitally signing an electronic version of the document.

For example, each party reviews the full document (with complete legal language). This could occur online, while the party is logged in to an online platform or offline after a party downloads the document and either reads it on an electronic device or prints it and reads it on paper. Each party provides confirmation that digitally signing a document constitutes a legally binding signature, equivalent to signing by hand with pen on paper. If a party to the document is an entity such as a company or a partnership (rather than an individual), then the individual who is acting on behalf of that entity agrees and represents that he or she is authorized to sign a docu-ment on behalf of the entity.

In an embodiment, the ability to sign the document is provided to each party, and the party (or the individual acting on behalf of the party) can apply their signature. There are many ways to apply a signature online that could be used, including, for example, clicking a button in an online user interface marked with a word or icon indicating that clicking that button constitutes signing the document or typing one's name using a keyboard or keypad to apply the signed name in the signature field of the document. The name typically would appear letter-by-letter as typed, either in a script font or a printed font. Another such approach includes drawing one's name in approximately the shape of one's handwritten signature on the signature line of the displayed document, as displayed on the screen of the device displaying the document. The drawing of the signature could be done using one's finger or a stylus on a touch-sensitive screen or using a mouse or other pointing device attached to the device displaying the document. Another approach includes clicking a button in an online user interface that applies a previously saved image of the user's signature to the document.

Records of the details of the signatures by the parties can be recorded, including the timestamps (time and date) of the signature, the method of the signature, and any other impor-tant information about the signature.

When all parties have signed the document online, offline, or a combination thereof, the candidate document can be considered a legally valid contract binding on all parties. Records of the signatures and the contract can be stored.

Negotiation engine 228 is further configured to provide notification services, including, for example, providing noti-fications when a contract is to expire among other such notifications.

In accordance with various embodiments, the various components described herein may be performed by any number of server computing devices, desktop computing devices, mainframe computers, and the like. Individual devices may implement one of the components of the system. In some embodiments, the system can include several devices physically or logically grouped to implement one of the modules or components of the message service. In some embodiments, the features and services provided by the system may be implemented as web services consumable via a communication network. In further embodiments, the system is provided by one more virtual machines imple-mented in a hosted computing environment. The hosted computing environment may include one or more rapidly provisioned and released computing resources, which com-puting resources may include computing, networking and/or storage devices. A hosted computing environment may also be referred to as a cloud computing environment.

Figure 3:
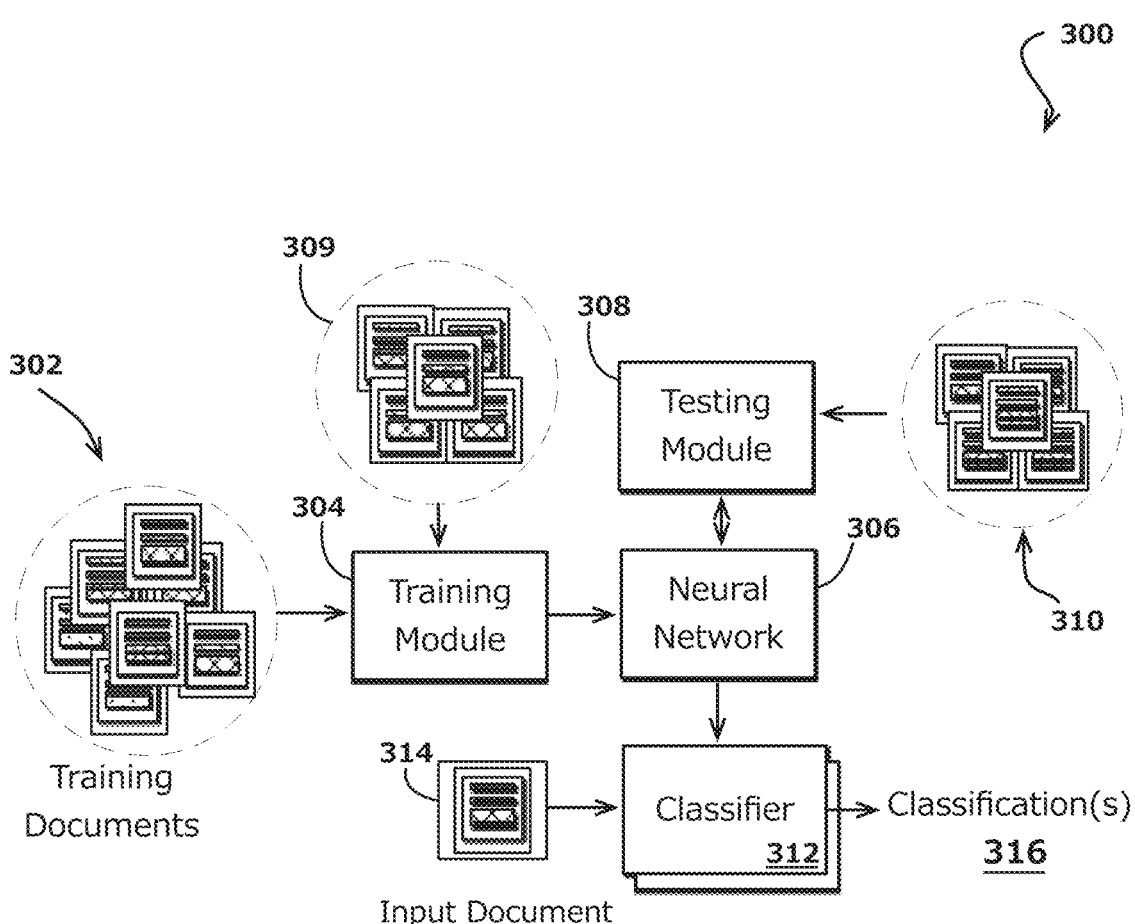
FIG. 3 illustrates an example classification pipeline that can be utilized in accordance with various embodiments.

FIG. 3 illustrates an example classification pipeline 300 that can be utilized in accordance with various embodi-ments. In this example, a set of documents 302 and 309 is obtained that can be used to train one or more models or neural networks 306 to associate a section of a document with one or more other document sections. Documents and sections can be obtained from a number of third-party providers of such documents, manually generated, or oth-erwise obtained.

In an embodiment, in order to function as training data for one or more models or neural networks, or other such machine learning algorithms, at least some of the documents will include (or be associated with) data that indicates a type or classification for individual documents and for sections represented in each document. The classifications in at least some embodiments can be selected from a set of classifica-tions, or sub-classifications used to identify various types of documents and/or sections of a document.

As described herein, the type of document can include, for example, land contract documents, sale of goods contract documents, nondisclosure agreement documents, non-com-pete agreement documents, engagement contract docu-ments, service provider and vendor contract documents, construction and renovation contract documents, ongoing maintenance contract documents, education and academia contract documents, finance and business contract docu-ments, workplace contract documents, real estate contract documents, among other such contracts or documents.

Document sections can include, for example, a preamble section, a recital section, words of agreement section; a definitions section; an action (consideration) section; a rep-resentation and warranties section; a covenants and rights section; a conditions to obligations section; a provisional and remedies section; a general provisions section; a signa-tures section, among other such sections. In accordance with various embodiments, a document section can be related to or otherwise associated with one or more document sections. For example, an "actions" document section that includes the exchange of promises that is the subject matter of the agreement can be related to a "definitions" document section or other such section.

In some embodiments, documents can be analyzed to determine which documents include data sufficient to identify a type of document and sections of the document, and those documents can be considered a training set to be used to train neural networks or other such models. In some embodiments, a portion of the training set will be retained as testing set 310 to use to test the accuracy of the trained neural network. In this example, the training documents are accessible to a training module 304 which can feed the documents to a neural network 306 to train the network. As mentioned, the document and classification data can be provided to the neural network so the neural network can learn features of document sections and their corresponding settings. The network can then learn various combinations or relations of features of different document sections and settings for those sections, such that when a document is processed with the trained neural network, the network can recognize the features and output the appropriate classification for a document and document sections, as well as information to associate a section of a document with one or more other document sections, although various other approaches can be utilized as well within the scope of the various embodiments.

In some embodiments, the training documents 302 are to be used as training data for a convolutional recurrent neural network, deep neural network, or other types of neural network or model. As mentioned, the documents can be classified, and associations determined, either when provided or through a classification analysis, to determine a classification for a document and document sections. Various other documents provided by third-party sources or generated from documents provided the third parties can be used for training as well as discussed and suggested elsewhere herein. The neural network can be trained using some or all of the designated training data.

Once at least the initial training has completed, a testing module 308 can utilize the testing documents 310 to test the trained neural network. Since the testing documents already include classification data, such as data operable to label, identify, or otherwise indicate ground truth, the classifications generated by the neural network can be compared against that data to determine the accuracy of the neural network, both overall and for different categories of document and document sections. The testing documents can also be used to train the neural network further. The results can be analyzed and if the results are acceptable, such as where the accuracy at least meets a minimum accuracy threshold for some or all of the classifications, the neural network can be provided to a classifier 312 that is able to accept an input documents 314 from various sources, such as customers or end users, and generate classifications 316 for the documents and document sections. The documents might also come from the provider itself.

In some embodiments, deep neural networks can be trained using a set of training documents exhibiting different classifications of documents and document sections and including information detailing those classifications. In other embodiments, generative adversarial networks (GANs) can be used that do not require the data seeding used for training deep neural networks. Various other approaches can be used as well as discussed and suggested elsewhere herein.

Deep neural networks, or deep learning, can involve representing documents as vectors or sets of edges or regions to simplify the learning task. These processes can allow for unsupervised learning and hierarchical feature extraction, among other such options. Deep learning algorithms can transform these inputs through multiple layers of transformation to describe causal connections between input and output. GANs can estimate a general model of such inputs using an adversarial process, as may utilize a generative model and a discriminative model. The discriminative model discriminates between different classes of data, such as a convolutional recurrent neural network trained to provide different outputs for different recognized classes. The generative model generates new data that fits the distribution of the training data. The generative model can be, for example, a Gaussian mixture model that can generate a set of points which approximately fit the training data. Various other networks or trained models can be used as well within the scope of the various embodiments. For approaches that require seeding, there can be a set of training data defined or otherwise generated for each attribute applied for a given category. The attributes can be defined by an administrator or other authorized entity or can be learned algorithmically based on user queries, among other such options.

Figure 4:
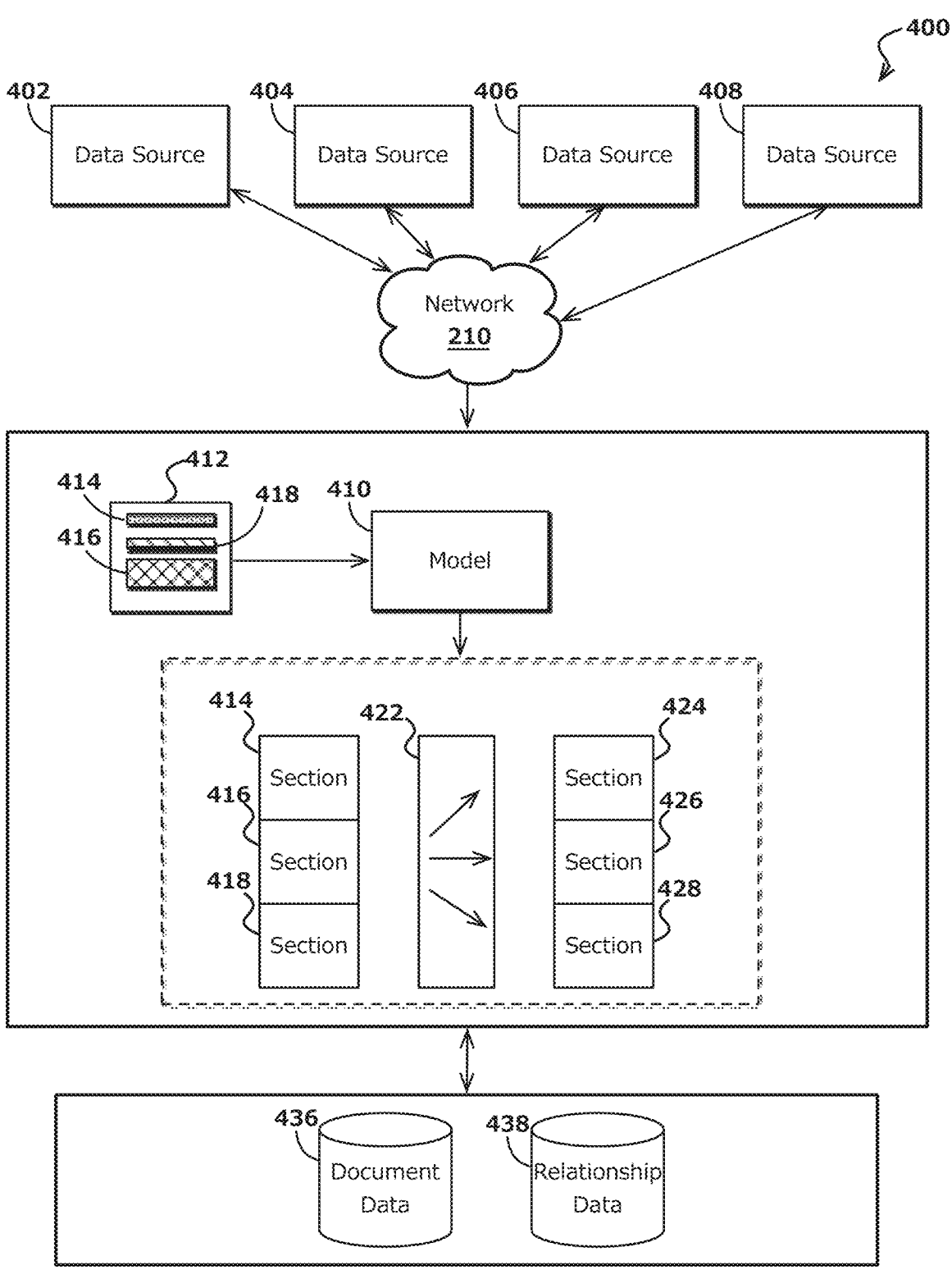
FIG. 4 illustrates an example approach to associate document sections in accordance with various embodiments.

Once the neural network is trained, the network can be used to, for example, associate a section of a document (a "document section") with one or more other document sections, as illustrated in example 400 of FIG. 4. In this example, documents can be obtained from one or more third party providers (402, 404, 406, 408). Third party providers can include, for example, providers of different types of documents. In accordance with various embodiments, obtaining the documents can include downloading the documents, receiving a stream of the documents, and/or generating the documents.

Document sections can include, for example, a preamble document section, a recital document section, words of agreement document section; a definitions document section; an action (consideration) document section; a representation and warranties document section; a covenants and rights document section; a conditions to obligations document section; a provisional and remedies document section; a general provisions document section; a signatures document section, among other such document sections.

A document can include, for example, a land contract, sale of goods contract, nondisclosure agreement, non-compete agreement, engagement contract, service provider and vendor contract, construction and renovation contract, ongoing maintenance contract, education and academia contract, finance and business contract, workplace contract, real estate contract, among other such contracts.

Model (e.g., a neural network, a statistical model, etc.) 410 can be used to analyze document 412 to associate document sections (414, 416, 418) of document 412 with one or more other document sections. The other document sections can include document sections 414, 416, 418, and well as document sections 424, 426, 428. As described, a document section may be associated with other document sections when it is determined that the sections are related. A document section may be associated with other document sections based on the type of categorization of a document section, available content settings of a document section, etc.

For example, document section 414 can be associated with document section 426 and 416 because they relate to similar subject matter of a legal contract. Document section 416 can be associated with document section 424 because the document section 424 expands on document section 416.

In accordance with various embodiments, document sections 424, 426, and 428 can be from the same type of document as document 412 or a different type of document.

Document 412 and other such documents can be stored in a database, such as database 436 and relationship, mapping, or other such information that is used to identify an association between document sections can be stored in database 438.

Figure 5:
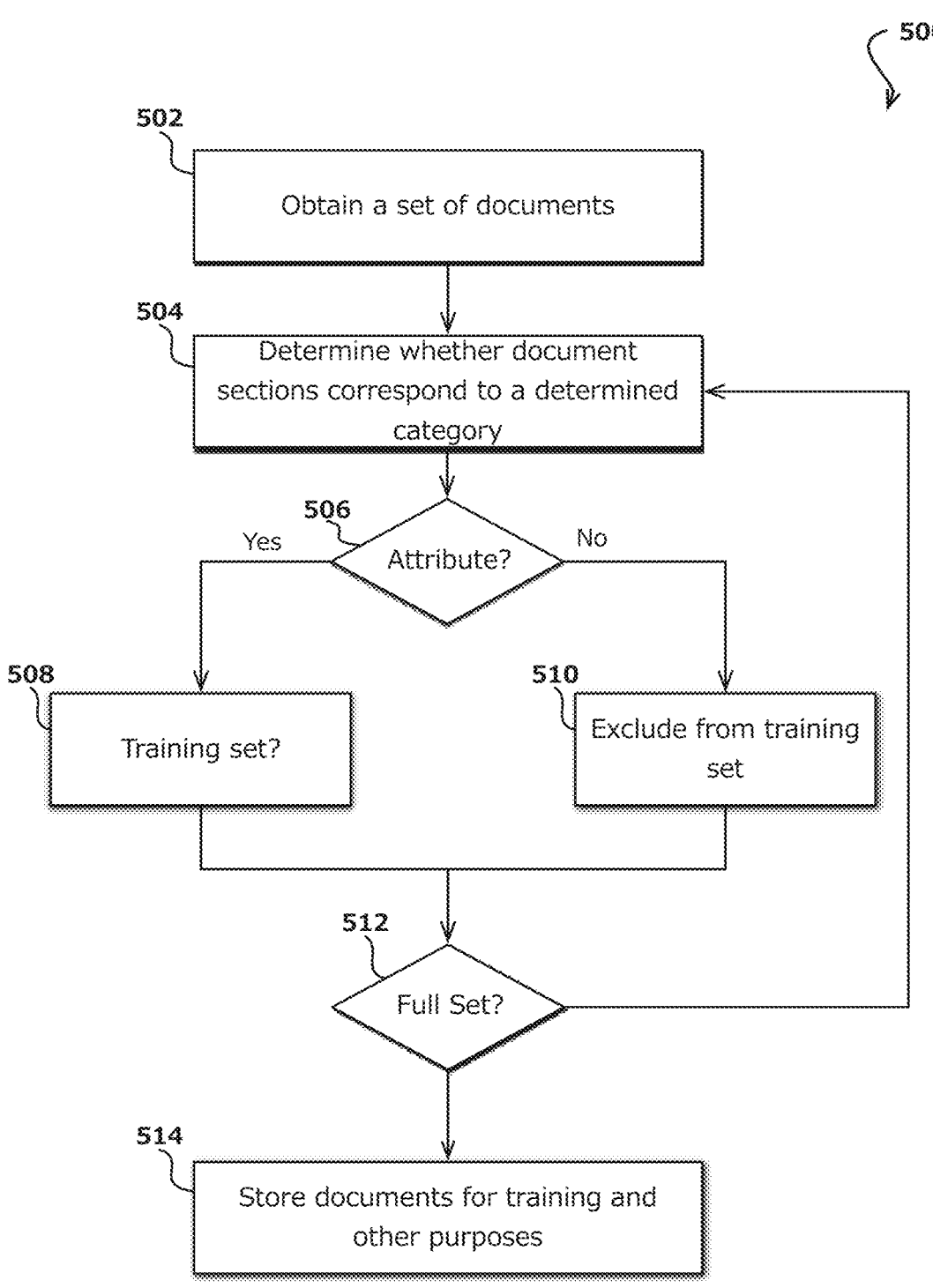
FIG. 5 illustrates an example process for determining training data that can be utilized in accordance with various embodiments.

FIG. 5 illustrates an example process 500 for determining training data that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a set of documents or document data can be obtained 502 for analysis. Documents can be obtained from a number of third-party providers of such documents, manually generated, or otherwise obtained. In certain embodiments, the documents can be from a catalog maintained by a service provider or a third party, or from multiple sources, among other such options. The documents can be legal documents, business documents, private documents, etc., and can include one or more document sections. A document section can be associated with content settings, which can be a response, statement, or description for a document section.

For at least some of the documents, such as a randomly selected subset or another such determination, such as the manner in which the documents were obtained (e.g., generated, downloaded, etc.), data or other information associated with the documents can be used to determine 504 whether a type or classification for individual document sections represented in individual documents correspond to a determined category and includes particular attributes, or types of attributes, for which a neural network is to be trained. This can include, for example, a specific category for a type of document or content section. The data can be any data associated with a document, such as metadata for that document, database text mapped to that document, and the like.

If it is determined 506 that a document or document section exhibits the attribute for a particular category, then that document can be added 508 to the training set. If not, the document can be excluded 510 from the training set. As mentioned elsewhere herein, in at least some embodiments, some of the documents may be instead added to a testing image set or not added to any set but may have the attribute classification associated therewith.

If it is determined 512 that a full training set has been obtained, using any appropriate criterion as discussed or suggested herein, then the training set generation can complete, and the documents can be stored 514 for training and other purposes. Otherwise, the process can continue until a full set is obtained, all of the relevant documents are analyzed, or another stop condition is satisfied.

Figure 6:
FIG. 6 illustrates an example process for training a neural network that can be utilized in accordance with various embodiments.
Figure 6:
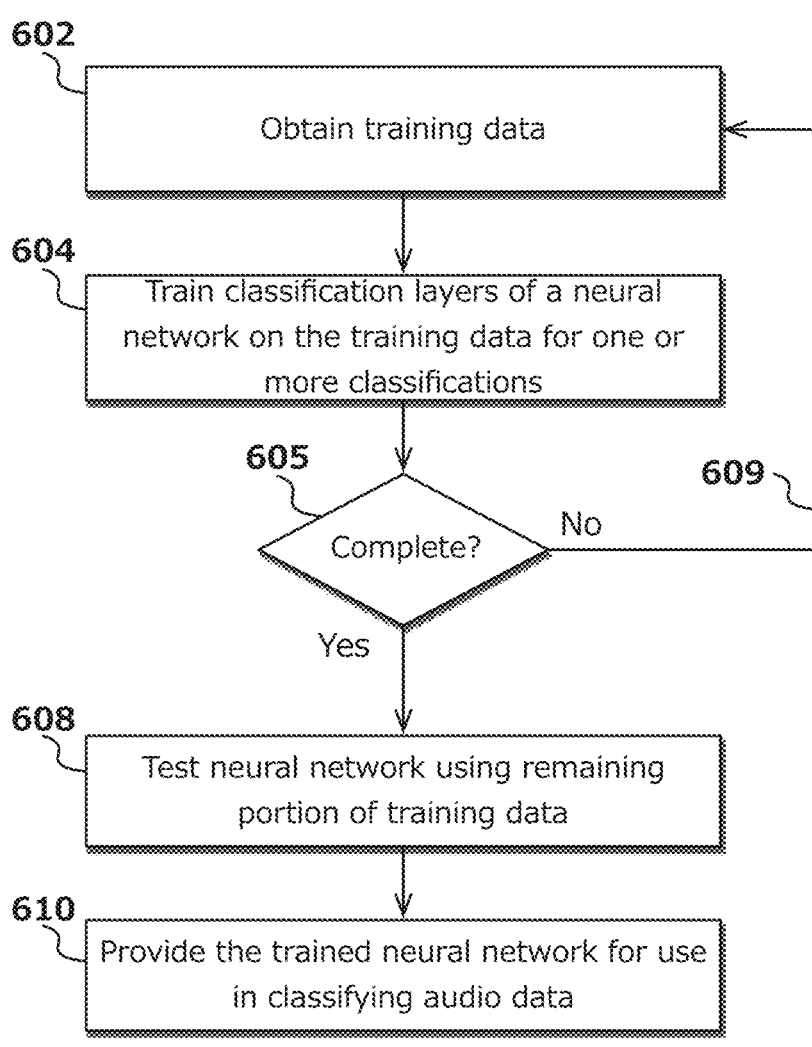

FIG. 6 illustrates an example process 600 for training a neural network that can be utilized in accordance with various embodiments. Once a set of training data is obtained 602, the training data can be provided as input to the network training process. The training data can include at least a set of documents that include (or are associated with) data that indicates a type or classification for individual documents and/or for sections represented in each document. The classification layers of the neural network can be trained 604 on the documents to associate a section of a document with one or more other sections. In this way, the network can then learn various combinations or relations of features for different document sections and settings of those sections, such that when a document is processed with the trained neural network, the network can recognize the features and output the appropriate classification for a document and document sections, as well as information to associate a document section of a document with one or more other sections, although various other approaches can be utilized as well within the scope of the various embodiments.

If it is determined 605 that a stop condition has been met so that training should be completed, such as by processing the entire training set or reaching a determined confidence threshold, then the trained neural network can be provided to classify, for example, documents and document sections of a document with other document sections. As discussed herein, the network might first go through a process to test 608 using at least some of the documents and document sections classified with the attribute type from earlier steps of the process. If the training is not complete, then the training process can continue 609 until a trained model is obtained. Thereafter, the trained neural network can be provided 610 to associate a section of a document with one or more other document sections.

Figure 7:
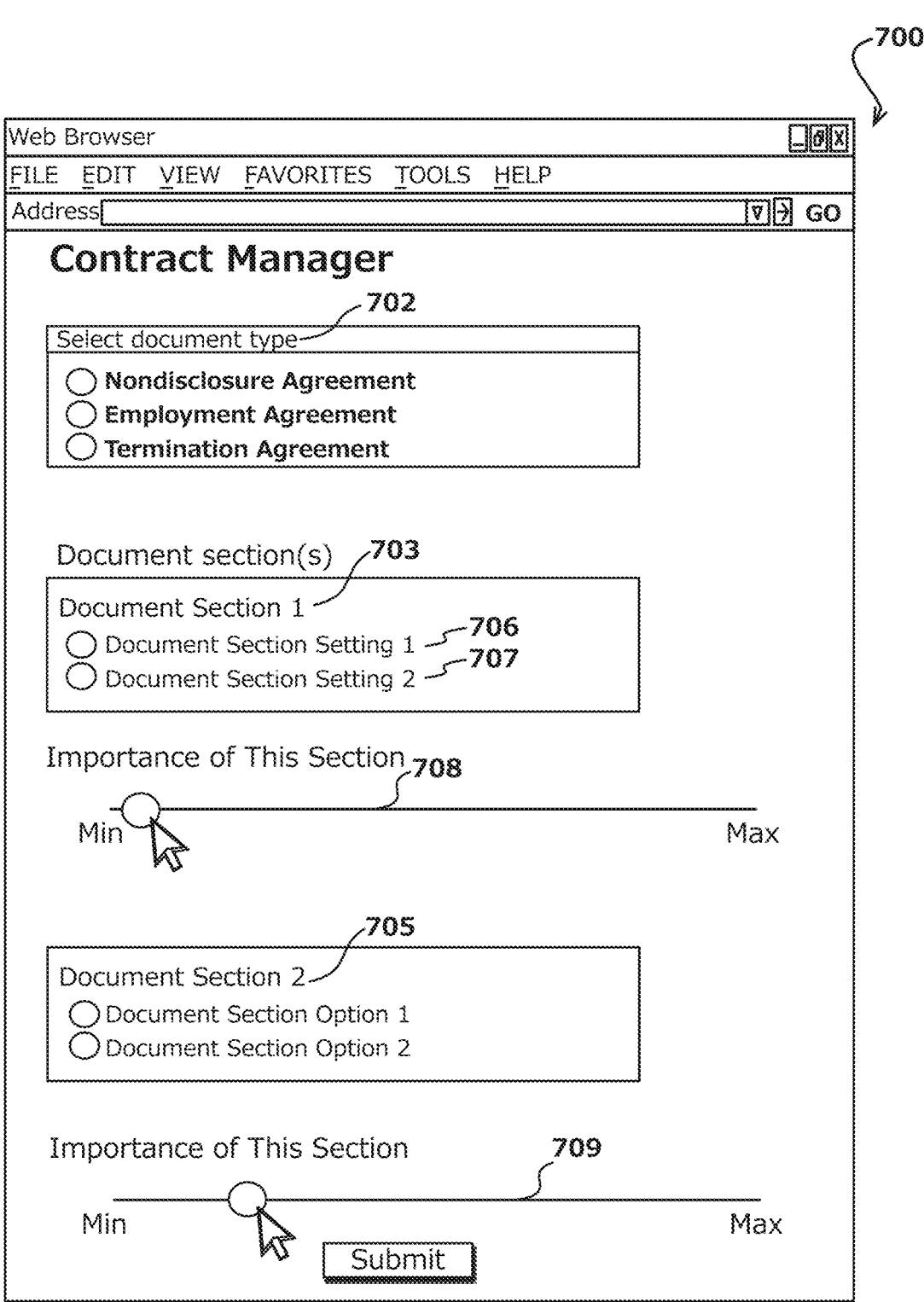
FIG. 7 illustrates an example interface that can be presented to a user in accordance with various embodiments.

FIG. 7 illustrates an example interface 700 that can be presented to a user of a content negotiation system in accordance with various embodiments. In this example, a user (e.g., a party to a contract) can utilize a content negotiation system to select a type of document 702 or contract. The document can be a contract, such a legal contract or other such contract. Example contracts include, for example, nondisclosure agreements, employment agreements, termination agreements, among other such agreements.

A document can include one or more document sections 703, 705. Document sections can include, for example, a preamble section; a recital section; words of agreement section; a definitions section; an action (consideration) section; a representation and warranties section; a covenants and rights section; a conditions to obligations section; a provisional and remedies section; a general provisions section; a signatures section, among other such sections.

Individual document sections can have different settings. For example, document section 703 can have settings 706 and 707. A setting can be a selection of a date or time, a description or answer, or other indication of preference by a user. For example, settings 706 and 707 for a remedies document section, can correspond to two variations in remedies as possible settings for the remedies document section in case of breach of contract.

A user can indicate importance or priority of a particular document section. For example, the interface can include one or more slider bars 708, 709 or other such elements to enable a user to adjust a level of importance of a document section. In an embodiment, a user can be prompted for a number from 1 to 10 for each section. The user may be prompted to order the listed sections from most to least important or drag and drop boxes or other graphical elements representing each section until the sections appear in order of importance to that party. In certain embodiments, a party may be given a fixed number of tokens to allocate among the listed sections, where the party may be asked to enter a number next to each section, corresponding to the number of tokens being "placed" on that section, or the party may be asked to operate graphical controllers for each section (such as a slider or dial) to set a level corresponding to the number of tokens being placed on that section, or the party may be asked to drag and drop icons or other graphical representations of the tokens to and among the different sections.

The provided inputs can be preference information as described herein and can be received at a negotiation engine configured to automatically generate or otherwise determine a contract or contract information that satisfies constraints of at least one party in a negotiation.

Figure 8:
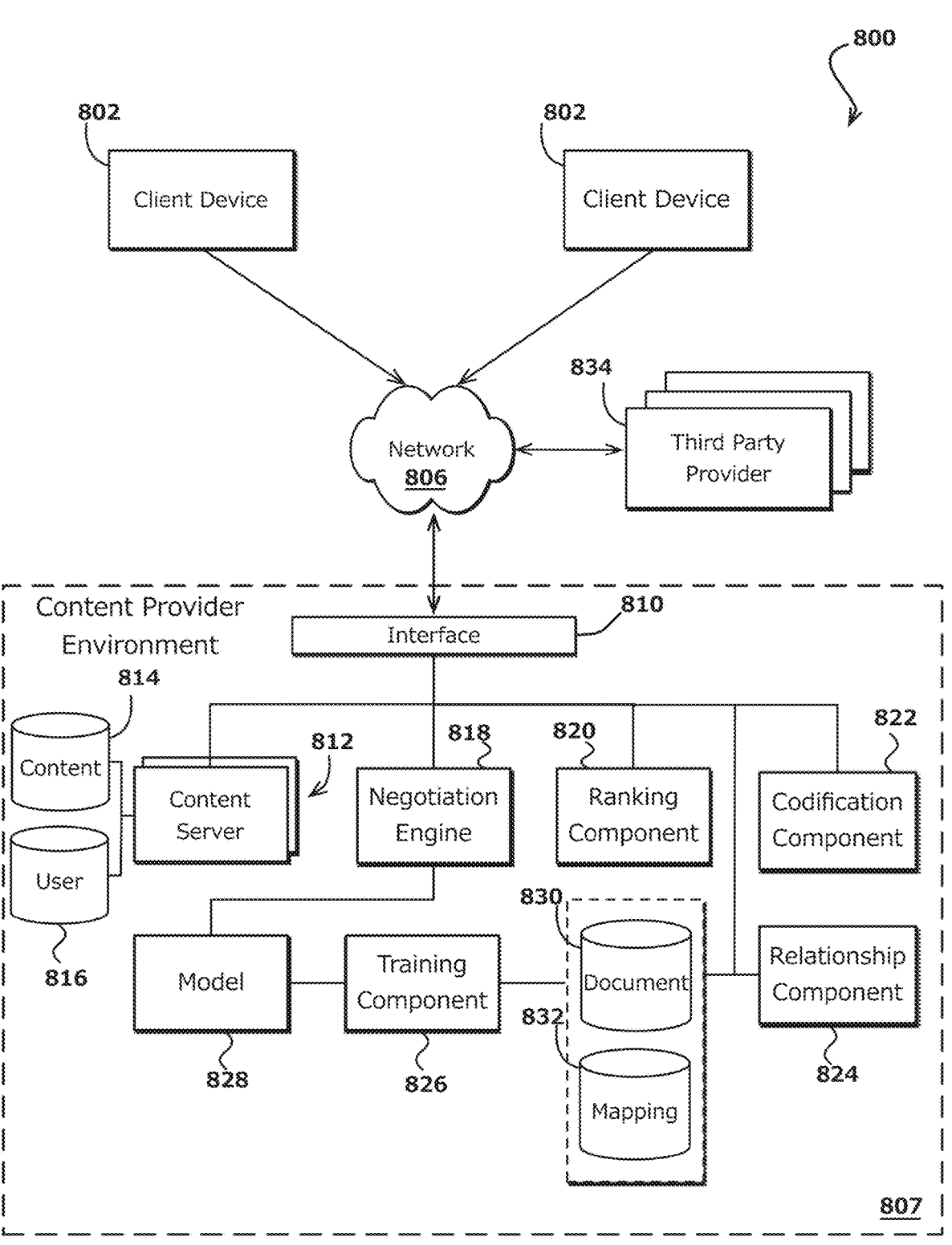
FIG. 8 illustrates an example environment in which aspects of the various embodiments can be implemented.

FIG. 8 illustrates an example environment 800 in which aspects of the various embodiments can be implemented. In this example, a user can utilize an application or interface, such as a browser, executing on a client device 802 to send requests over at least one network 806. In accordance with various embodiments, the request can be to negotiate and generate a document (e.g., a contract) that satisfies constraints of parties to a negotiation. In various embodiments, the request can be on behalf of a user or party to a contract, for example. The client device 802 can be any appropriate computing device capable of requesting, receiving, and/or presenting content, such as may include a desktop computer, a thin client device or "dummy terminal," a smartphone, an e-book reader, a tablet computer, a notebook computer, a personal data assistant, a video gaming console or controller, a smart television, a wearable computer (e.g., a smartwatch or glasses), or a portable media player, among others.

In this example, the client device 802 is in communication with a content provider 807 via the at least one network 806. In accordance with various embodiments, content provider 807 can provide one or more services. For example, the content provider can provide a negotiation service; a document creation, storage, and modification; and other such services. The at least one network can include a wired and/or wireless network, as may include the Internet, a cellular network, a local area network (LAN), an Ethernet, an Intranet, and the like. The client device 802 may have varied local computing resources, such as may include central processing units and architectures, memory, mass storage, graphics processing units, communication network availability and bandwidth, etc.

The request can be received to an interface and/or networking layer 810 of the content provider 807. The interface and/or networking layer can include any of a number of components known or used for such purposes, as may include one or more routers, switches, load balancers, Web servers, application programming interfaces (APIs), and the like.

If the request is an authorization request for content, such as a document, access, or otherwise, information for the request as well as information associated with the request can be directed to one or more content servers 812 or another component of the provider environment 807, which can obtain the content from a content data store 814 or other such repository to be sent back across the network(s) to the computing device. The server 812 can be any appropriate type of server or other such computing devices, as may include one or more application servers operable to process instructions provided by a user or database servers operable to process data stored in one or more data stores in response to a user request. In some embodiments, information for the request might also be compared against user data in a user data store 816 or other such location to determine, for example, whether the user has access rights to that content.

As described, a user can attempt to enter into a contract with one or more other users. In this example, the user(s) can be associated with user accounts, can use client devices 802 and 803 to create a document (e.g., a contract) as part of a business transaction, partnership, or some other agreement.

As shown in FIG. 8, the provider 807 can include negotiation engine 818, ranking component 820, codification component 822, relationship component 824, training component 826, model 828, although additional or alternative components and elements can be used in such a system in accordance with the various embodiments. Accordingly, it should be noted that additional services, providers, and/or components can be included in such a system, and although some of the services, providers, components, etc., are illustrated as being separate entities and/or components, the illustrated arrangement is provided as an example arrangement and other arrangements as known to one skilled in the art are contemplated by the embodiments described herein.

During a preprocessing stage, document data can be obtained and stored in data store 830. The document data can be obtained from third-party providers 834 of document data, the Internet, users of an application or service, publicly available document data, content provider 807, and the like.

Relationship component 824 can include one or more processing components operable to process the document data to identify associations between document sections. As described, a document may include document sections (e.g., clauses or provisions) of a contract. The mapping or relationship information can be determined using, for example, model 828 or other models such as model 410 in FIG. 4.

For example, as part of a preprocessing process, documents designated as part of a training set for training a model 828 such as a neural network or other machine learning-based approach using training component 826 for attributes associated with a category of documents or document sections. As described, the documents in the set can be analyzed using a classification process or other such process to determine whether document sections represented in those documents correspond to a determined category and include particular attributes, or types of attributes, for which a neural network is to be trained. Training component 826 can perform the training on model 828 and provide the resulting results and/or trained classifiers or models for use in determining the appropriate classifications.

In certain embodiments, training a model or neural network may involve significant use of computation resources and time, such that this may correspond to a preparatory step to classifying documents and document sections and/or performed relatively infrequently with respect to contract creation requests and/or according to a schedule. According to some embodiments, training documents and respective training labels can be located in a data store 830.

Once model 828 is trained, relationship component 824 can at least associate a section of a document with one or more other sections. The associations can be represented as mapping information or other such information and can be stored in data store 832. As will be described further herein, negotiation engine 818 or other component can utilize the mapping information to select a candidate documents from a plurality of candidate documents when determining a document that satisfies constraints of the parties.

For example, in accordance with various embodiments, a request for a document, such as a contract can be received at interface 810. Negotiation engine 818 can obtain information associated with the request, including, for example, preference information from one or more parties. The information can include, for example, party preference information for a contract such as setting information for specific document sections (e.g., clauses or provisions) of a contract as well as relative importance (or "priority") information for the document's sections, among other such information.

Codification component 822 can convert at least a portion of the information associated with the request. For example, codification component 822 can receive at least the input preference information and can generate or otherwise represent the input preference information as numbers, discrete symbols (represented by alphanumeric strings) or other computer-readable instructions. In accordance with an embodiment, some input preference information may be numeric, for example, information for a salary in an employment contract. In this example, the information may remain numeric without codification, although in certain embodiments the information can be normalized (e.g., in this example, as a multiple of an average salary).

In accordance with various embodiments, other input information may be non-numeric discrete values. Discrete alphanumeric strings can be used to express the input information in this example. For example, a document such as a contract may name a U.S. State whose laws are to govern the contract. In this example, the string "Virginia" can represent the State of Virginia. Codification component 822 may use the string "Virginia," or may convert the string to a standard constant length symbolic representation of the string, such as, "VA." In certain embodiments, numbers may be used to represent discrete values. For example, using the fifty states in the U.S. States, a number may be assigned to each of the fifty states. As an example, the number one can be assigned to Alabama, and the number 2 can be assigned to Alaska, and so on.

Once the input preference information is processed to a set of values, for example, a numerical or symbolic (i.e., alphanumeric) list or vector representation, ranking component 820 can be utilized to attempt to generate ranking values from the set of values for a plurality of candidate contracts. For example, ranking component 820 can utilize one or more algorithms that can measure the degree to which settings for a candidate contract section satisfy the information provided by the parties. This can include in certain embodiments determining a document section ranking value or score for document sections of candidate documents, where the document section ranking value can represent a likelihood of a setting for a candidate document section satisfying the preference information of the parties for that section. In the situation where priority information is available for a document section, document section ranking values can be weighted or otherwise adjusted to reflect priority information associated with the document section. For example, document section ranking values for a document section for individual parties can be increased or decreased based on priority information for the document section. Negotiation engine 818 can then attempt to use the document section ranking values to optimize an optimization function (e.g., a cost function or other such function) to determine document selection scores for the plurality of candidate contracts, where a document selection score measures the degree to which a candidate contract satisfies the preference information associated with a particular party. In the situation where the maximum ranking score is used to determine whether a document optimizes the optimization function, the optimization function can be referred to as a "satisfaction function." In the situation where minimal score is used to determine whether a document optimizes the optimization function, the optimization function can be referred to as a "cost function."

In a nonlimiting example, assume negotiation engine 818 and ranking component 820 utilize a cost function. In this example, "s" can represent the set of candidate documents. The reference "i" can represent at least the input preference information. Negotiation engine 818 and ranking component 820 can be used to evaluate the various inputs (i is composed of multiple pieces of data) to generate various terms of the function. Some specific terms of the function can include a distance metric, numeric values, symbolic values, non-preference inputs, etc.

In an embodiment, a distance metric for each contract setting associated with preference information can be used to measure the distance, for each party, between the party's desired setting for that section and the setting in the candidate contract, s. The distance metric operates based on the type of setting for individual contract sections. For example, for numeric values, the difference in value between i and s can be used as is, or with some additional processing, such as the absolute value or square of the difference. In an embodiment, the latter leads to determining the "least squares" solution, which is amenable to well-known techniques of numerical analysis. In another example, for symbolic values (e.g., state names for governing law), an ad hoc distance metric may be implemented, such as an indication how similar or dissimilar two states' legal codes are. In the situation a nuanced metric is not available, a binary metric can be used, with a distance (value) of zero if the party's preference matches the setting in the solution s, and a fixed non-zero otherwise.

Non-preference inputs can be evaluated in various ways, depending on the nature of the information. Some may use a distance metric as described above; for example, in a candidate solution for an employment contract, the distance (difference) between the compensation in the candidate contract and the average compensation in the industry can be measured. Other types of input data may require ad hoc terms in the cost function. For example, if one part of the input is social data indicating that a certain type of contract clause is rarely used, then the presence of that clause in the candidate solution s may produce a high value (representing a high cost) term in the cost function, if its presence reduces the likelihood of both parties finding that contract satisfactory.

The various terms of the cost function can then be combined to produce an overall cost for the candidate contract s. The combination may be a sum, a linear combination, or other such combination with coefficients representing the relative importance of individual terms in the cost function. In some embodiments, the combination can be non-linear, for example to more strongly avoid selection of contracts that may be particularly objectionable to one of the parties.

In an embodiment, the relative importance can be estimated through statistics of past contract acceptance or based on the designers' intuitive judgments if past contracts are not available, among other such approaches. As part of combining the terms, the distances for one party's preferences can be compared to the distances for the other party to obtain a measure of which party's preferences the candidate solution is closer to. In various embodiments, the measure, or distance value, can be compared to a threshold or can be otherwise used to indicate how fair the contract is and the degree to which the parties' preferences are fairly balanced. For example, a greater distance (e.g., distance value), or a distance above a predetermined threshold may indicate that the candidate solution favors a first party. In another example, a smaller distance (e.g., distance value), or a distance below a predetermined threshold may indicate that the candidate solution favors a second party, where the first and second partiers are different entities.

It should be noted that negotiation engine 818 and ranking component 820 when utilizing a cost function can assign a number (cost) to each member of the solution space, e.g., a contract, where the number also depends on the inputs, such as the preferences of each party to the contract. A particular solution (contract) may be an optimized solution for one set of inputs but be very poor on the next set of inputs. Accordingly, the cost function is optimized for each new set of inputs, corresponding to each new set of parties seeking to form a contract.

The optimization process operates by repeatedly evaluating the cost function "f" on multiple candidate contracts, at each step seeking a solution that is better (e.g., lower value) than previously solutions. Intuitively, negotiation engine 818 and ranking component search through the solution space for an optimized solution for a particular set of inputs.

It is important to note that the optimization process may not always find the overall best solution in the solution space but may instead find a solution that is "good enough;" finding the absolute best solution may be infeasible given limited time and computing resources.

The candidate documents can be sorted and/or otherwise searched based on respective ranking values, and a document that optimally satisfies the desired intent of the parties can be presented. Once a document is determined, content server 812 can generate and present a document or at least a summary or other description of sections of the document to the users.

In an embodiment, generating the document can include, for example, mapping the candidate document to a set of document settings to generate the document based on the set of document settings. For example, individual candidate documents that make up the solution space can be represented as a vector of numbers or other symbolic values. Mapping the candidate document can include, for example, mapping values of the vector to settings for the document sections of the document or contract. The settings can be used in certain embodiments to describe the variable parts of the document to the parties, in the form of a list of contract settings or similar description. Based on the settings, a document with appropriate text can be generated. As described, the document may be a legal document. The text can be, for example, legal text for the document. In this example, the settings of a document section can correspond to a part of a legal contract, with full legal text, and, in some cases, a numerical or symbolic value.

In accordance with various embodiments, the various components described herein may be performed by any number of server computing devices, desktop computing devices, mainframe computers, and the like. Individual devices may implement one of the components of the system. In some embodiments, the system can include several devices physically or logically grouped to implement one of the modules or components of the message service. For example, the system can include various modules and components combined on a single device, multiple instances of a single module or component, etc. In one specific, non-limiting embodiment, negotiation engine 818, ranking component 820, codification component 822, relationship component 824, training component 826, and model 828, can execute on one device and content server 812 can execute on another device, and authentication component can execute on yet another device. In another embodiment, the components can execute on the same device or other combination of devices.

In some embodiments, the features and services provided by the system may be implemented as web services consumable via a communication network. In further embodiments, the system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

As described, a user can attempt to enter into a contract with one or more other users. The user(s) can be associated with user accounts, can use client devices to attempt to create a document (e.g., a contract) as part of a business transaction, partnership, or some other agreement.

Figure 9:
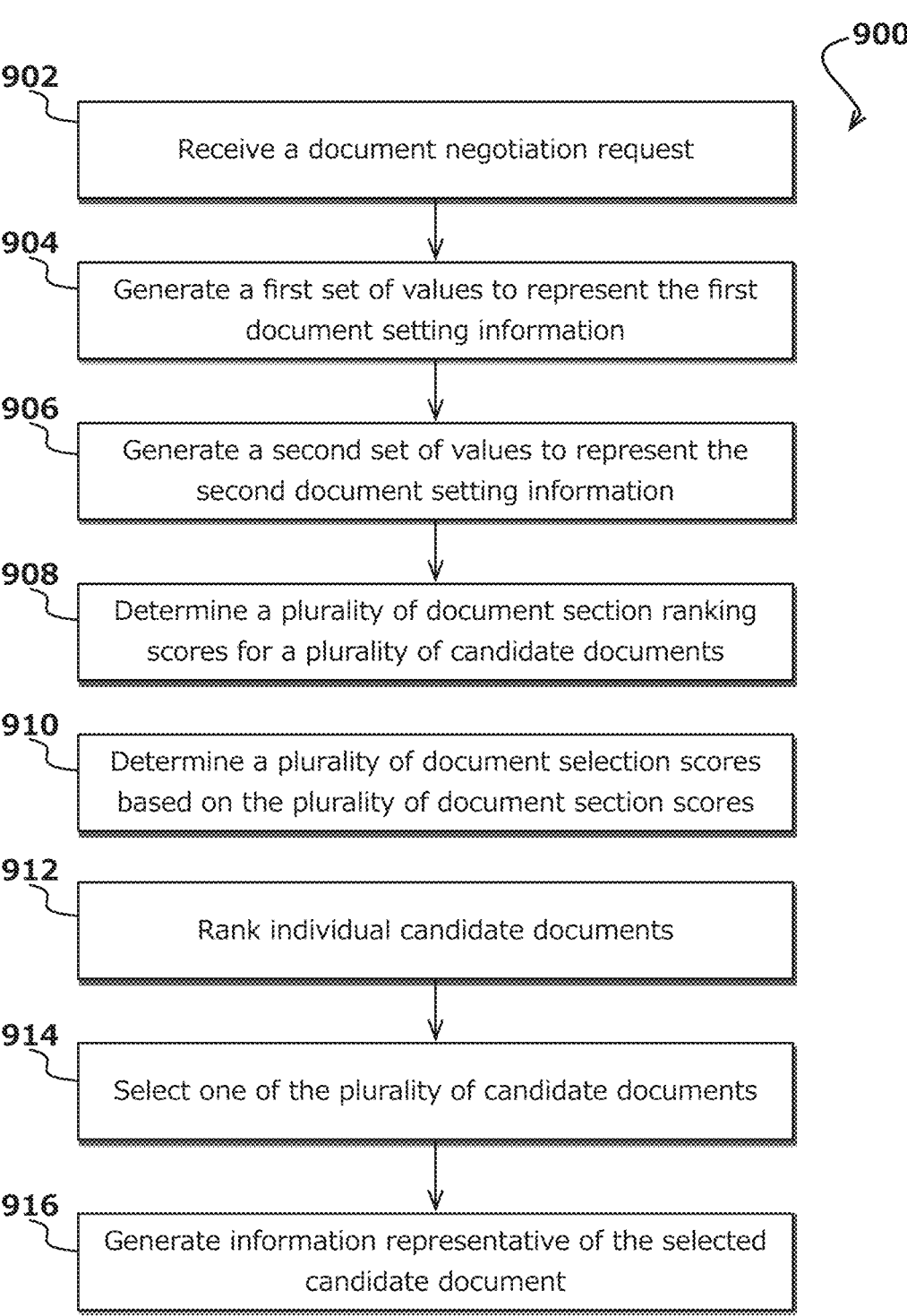
FIG. 9 illustrates an example process for automatically generating document information in accordance with various embodiments.

For example, FIG. 9 illustrates an example process 900 to automatically generate or otherwise determine a document (e.g., a contract) or document information that satisfies constraints of at least one party in a negotiation that can be utilized in accordance with various embodiments. In this example, a document negotiation request can be received 902. The request can be received at a document negotiation component or other such components from at least one party to a negotiation. The document can be, for example, a legal contract, or other such contract. The document generation request can be associated with at least a first user account and a second user account, the first user account associated with first preference information, the second user account associated with second preference information. The first preference information includes first document setting information and the second preference information includes second document setting information. In certain embodiments, first preference information includes first priority information and second preference information includes second priority information. As described herein, document setting information describes party choices for document sections, or provisions, or a contract. A first set of values is generated 904 to represent the first document setting information and a second set of values is generated 906 to represent the second document setting information. In the situation where priority information is obtained, first and second priority information can be generated. As described herein, generating the values can include, for example, using a codification technique to map or otherwise convert preference information (e.g., setting and/or priority information) to computer readable instructions that can be utilized to negotiate document sections of a contract.

A ranking technique can be used to determine 908 a plurality of document section ranking scores for document sections of a plurality of candidate documents based at least in part on the first document setting information and the second document setting information. A ranking score in various embodiments can represent the likelihood of a setting for a candidate document section satisfying preference information of the parties. In the situation where priority information is available for a document section, document section ranking values can be weighted or otherwise adjusted to reflect priority information associated with the document section. For example, document section ranking values for a document section for individual parties can be increased or decreased based on priority information for the document section.

An optimization technique can use the plurality of document section ranking scores to optimize an optimization function (e.g., a cost function or other such function) to determine 910 document selection scores for the plurality of candidate contracts, where a document selection score measures the degree to which a candidate contract satisfies the preference information associated with a particular party. The selection scores can be used to rank 912 individual candidate documents, for example, by how well a candidate document optimizes (e.g., minimizes or maximizes) the optimization function. In an embodiment, a document may optimize the optimization function if, for example, a document selection score is the largest ranking score or the smallest score. In the situation where the largest document selection score is used to determine whether a document optimizes the optimization function, the optimization function can be referred to as a "satisfaction function." In the situation where the smallest document selection score is used to determine whether a document optimizes the optimization function, the optimization function can be referred to as a "cost function."

At least one of the plurality of candidate documents can be selected 914 based at least in part on the plurality of ranking scores. For example, the candidate documents can be sorted and/or otherwise searched based on the ranking scores, and a document that optimally satisfies the desired intent of the parties can be selected.

Thereafter, information representative of the selected candidate document or the document can be generated 916. The information and/or a document can be presented to the parties, stored, and/or otherwise made available. The parties can execute the contract, modify, store, or otherwise interact with and/or process the contract.

Figure 10:
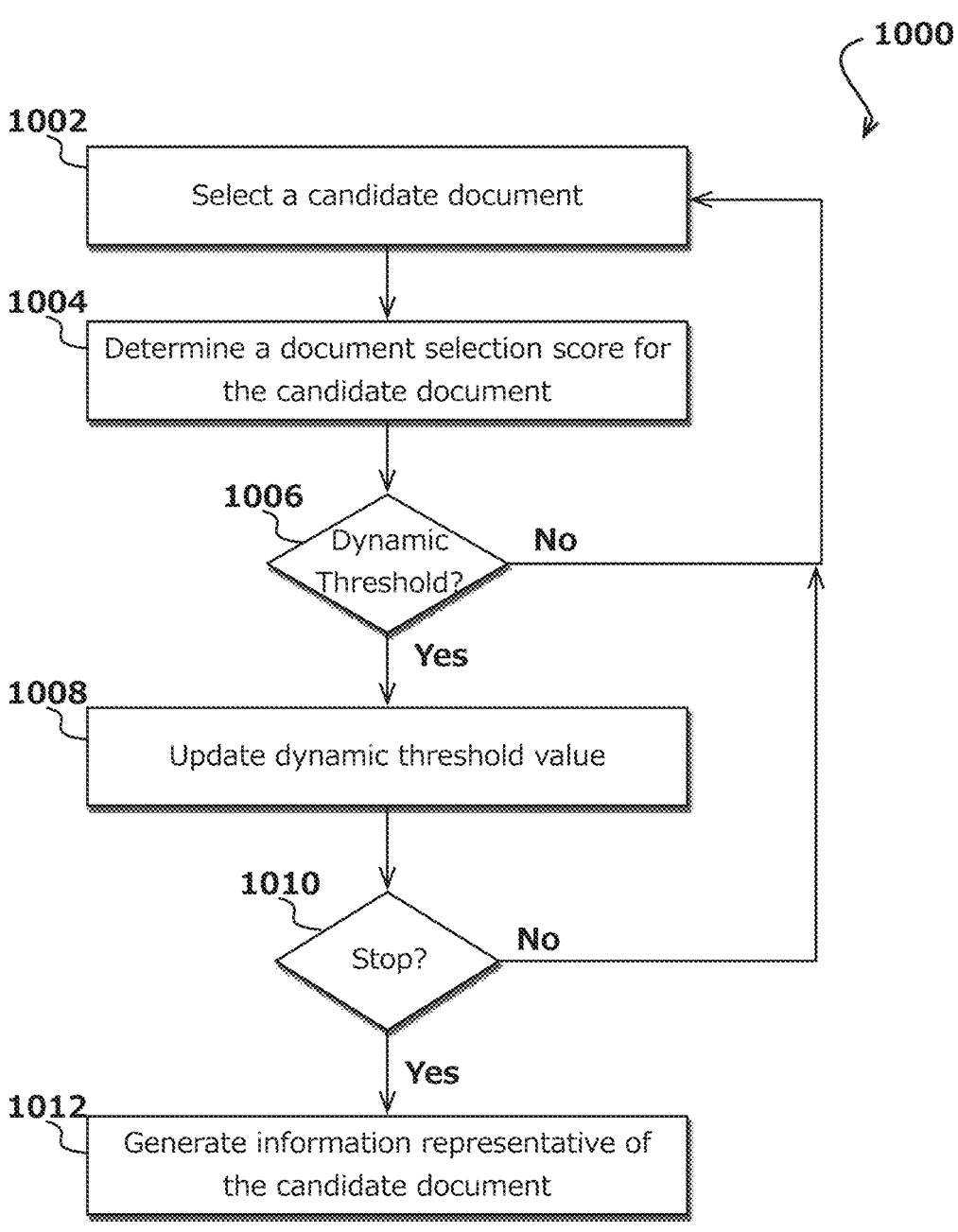
FIG. 10 illustrates an example process for optimizing document selection in accordance with various embodiments.

As described, an optimization technique can use a plurality of document section ranking scores to optimize an optimization function (e.g., a cost function or other such function) to determine document selection scores. FIG. 10 illustrates an example process 1000 of one such optimization technique that can be utilized in accordance with various embodiments. In this example, a candidate document is selected 1002 from a plurality of candidate documents. As described, a candidate document includes documents sections and the document sections are associated document section settings. As described, individual document types include particular document sections. The document sections can be associated with one or more possible document section settings. The plurality of candidate documents can include all possible combinations or at least a portion of all combinations of document section settings for the available document sections. The initial candidate document can be randomly or arbitrarily selected, selected based on selection criteria, the first candidate document, etc.

A document selection score can be determined 1004 for the candidate document based at least in part on document section scores for document sections of the candidate document. A determination can be made 1006 whether the document selection score satisfies a dynamic threshold value. The dynamic threshold value can be associated with a default value, for example, the maximum value allowed by a computing device, or some other default value. In the situation where the document selection score satisfies the dynamic threshold value, for example, is less than the threshold value, the dynamic threshold value can be updated 1008 to match the document selection score.

A determination can be made 1010 whether a stopping criterion is met. An example stopping criteria can include, for example, determining that a candidate document is associated with a document selection score less than a predetermined stopping threshold. In an embodiment, the stopping threshold can be based on historical data of contracts shown to be satisfactory to users, where a satisfactory contract can be a contract accepted by users. For example, the historical data can be analyzed to determine an average, median, or other such document selection score associated with accepted contracts. In another embodiment, the stopping threshold can be a predetermined number of candidate documents, where the predetermined number of candidate documents can be manually set as all possible candidate documents, half of all possible candidate documents, etc. In yet another embodiment, the stopping threshold can be based on an amount of experience and/or time for a particular search.

In the situation where the stopping criterion is met, a candidate document can be generated 1012. In the situation where a stopping criterion is not met, a new candidate document from the set of candidate documents is selected 1014 and analyzed until the stopping criterion is met.

Figure 11:
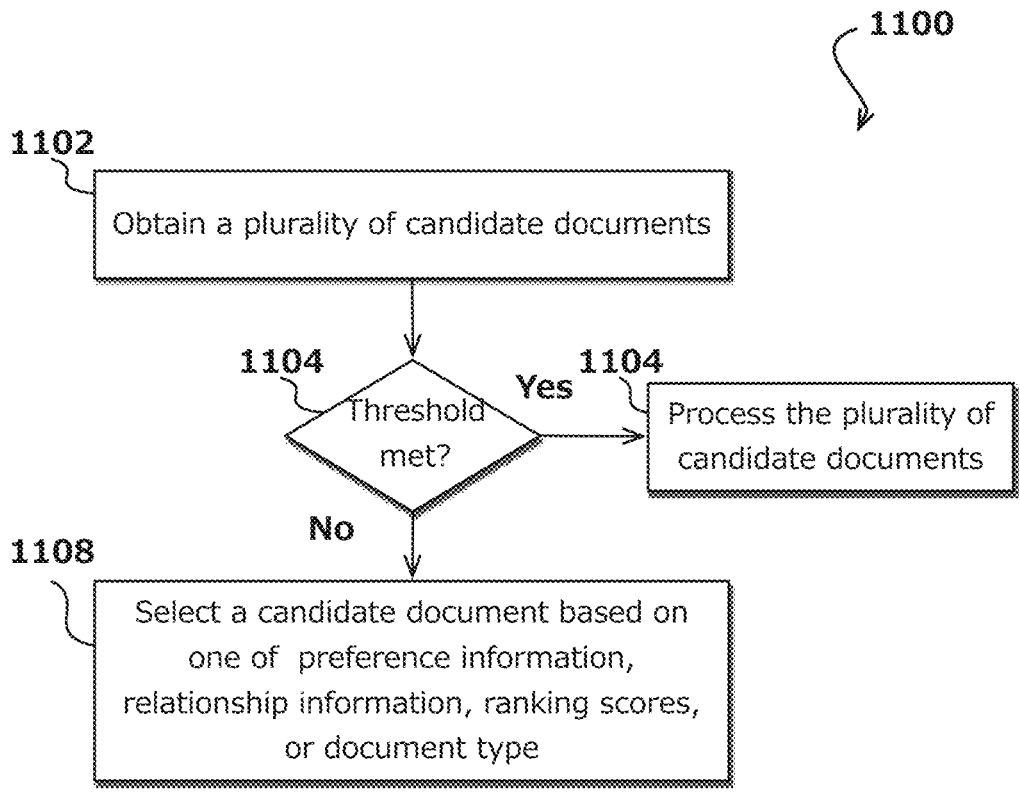
FIG. 11 illustrates an example process for selecting candidate documents in accordance with various embodiments.

As described, individual candidate documents include document sections, where the document sections of a particular document are based on the type of document requested by the users and the preference information associated with the users. The document sections can be associated with one or more document section settings. The plurality of candidate documents can include all possible combinations of document section settings for the available document sections and selecting the next candidate document includes determining which candidate document to select. FIG. 11 illustrates an example process 1100 for determining which candidate documents to analyze in accordance with various embodiments.

In this example, a plurality of candidate documents is obtained 1102. A determination can be made 1104 whether the number of candidate documents is below a threshold number of candidate documents. In the situation where the number of candidate documents is below the threshold number of candidate documents, or otherwise satisfies the threshold number of candidate documents, the plurality of candidate documents can be analyzed 1106. For example, the next candidate document in a list of the plurality of candidate documents can be selected and processed until all or at least a threshold number of candidate documents are processed. In an embodiment, the number of candidate documents may be below the threshold when, for example, a document type under negotiation includes or is otherwise associated with a number of document sections less than a determined threshold number. In the situation where the number of candidate documents does not satisfy or is above the threshold number of candidate documents, for example, because the candidate documents are associated with a number of document sections greater than the determined threshold number, an approach to select the next candidate document can be determined 1108 based at least in part on party preference information, mapping or relationship information, document section scores, document type, or a combination thereof.

For example, in one such approach, document section scores can be used with a gradient descent technique to select a candidate document. For example, partial derivatives of the optimization function, e.g., cost function, can be determined, and a slope of the optimization function can be determined to select a candidate document expected to have a lower (e.g., better) document selection score. Other approaches may utilize a convex programming technique, a stochastic gradient descent technique, Newton's method, among other such numerical optimization techniques.

In another approach, mapping information can be used with at least one probabilistic technique to select a candidate document. In this approach, a neighboring candidate document from a current candidate document can be randomly selected by choosing one of the document sections and selecting a candidate document with an alternate setting for that document section. The document section can be selected based on the mapping information or other such information. If the candidate document with the randomly selected document selecting has a lower (e.g., better) document selection score than the current candidate document, the randomly selected document can be selected.

In yet another approach, a simulated annealing technique can be used to select a candidate document. This approach assigns a probability to a neighboring candidate document when determining the cost function of the neighboring candidate document.

In yet another approach, a model can be trained on preference information for particular document types and document settings for sections of the document types to select a candidate contract. In this example, historical data for preference information and documents generated or otherwise selected based on the preference information from one or more users can be used to train a model such as a neural network. The neural network can thus be trained on the information to learn relationships between the preference information and documents in the training data so that when a trained model receives preference information for a type of document, the model can use the relationships it has learned to infer the candidate document that satisfies the preference information from the users.

Figures 12A, 12B:
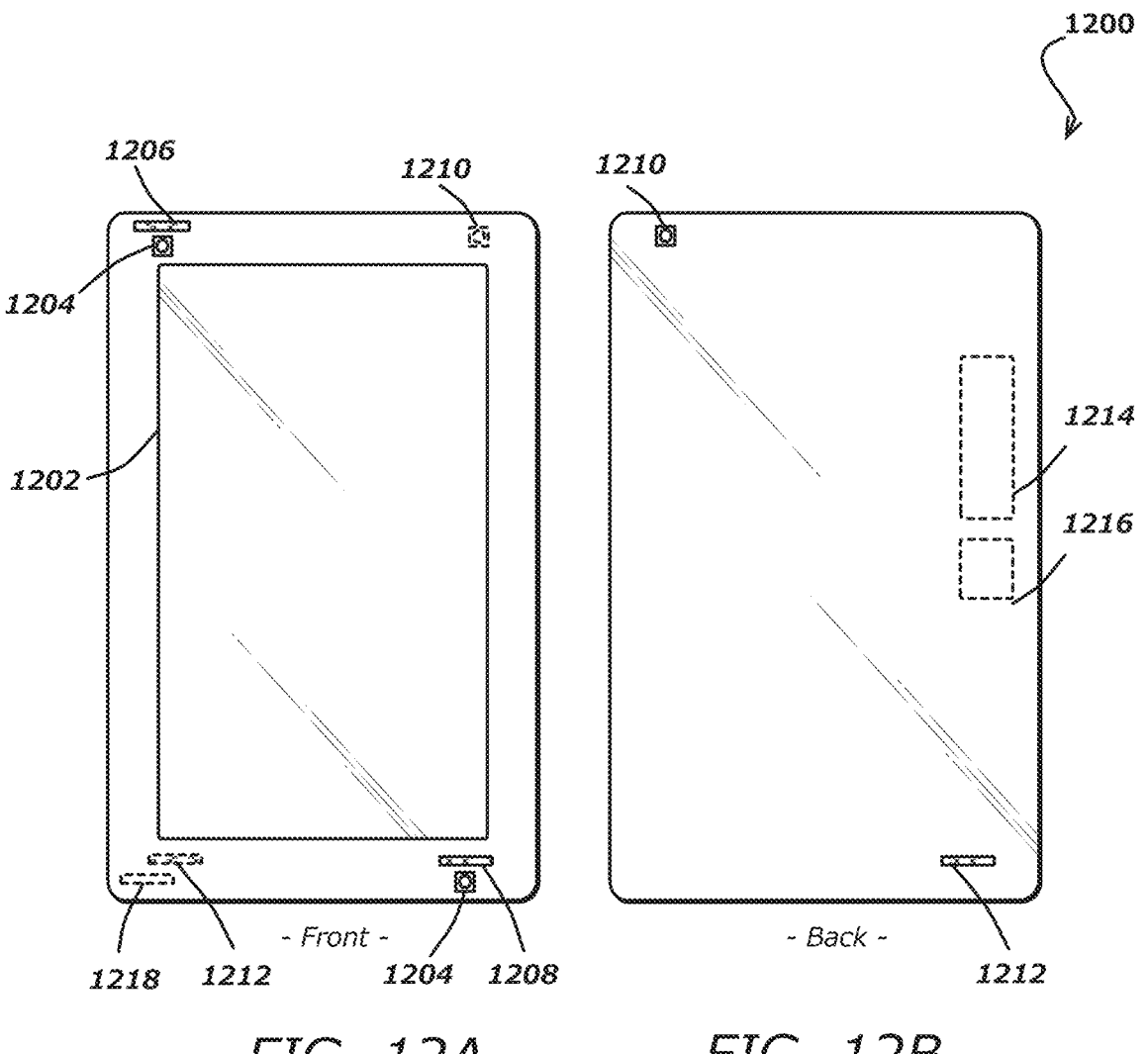
FIG. 12A and FIG. 12B illustrate front and back views of an example device that can be used in accordance with various embodiments.

FIGS. 12A and 12B illustrates front and back views of an example electronic computing device 1200 that can be used in accordance with various embodiments. For example, the computing device can be used by parties seeking to negotiate document sections (e.g., clauses or provisions) of a document such as a contract. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1200 has a display screen 1202 (e.g., an LCD element) operable to display information or document content to one or more users or viewers of the device. The display screen of some embodiments displays information to the viewers facing the display screen (e.g., on the same side of the computing device as the display screen). The computing device in this example can include one or more imaging elements, in this example including two image capture elements 1204 on the front of the device and at least one image capture element 1210 on the back of the device. It should be understood, however, that image capture elements could also, or alternatively, be placed on the sides or corners of the device, and that there can be any appropriate number of capture elements of similar or different types. Each image capture element 1204 and 1210 may be, for example, a camera, a charge-coupled device (CCD), a motion detection sensor or an infrared sensor, or other image capturing technology.

The computing device can also include at least one microphone or other audio capture elements capable of capturing audio data, such as words spoken by a user of the device, although audio elements are not required in at least some devices. In this example there are three microphones, one microphone 1208 on the front side, one microphone 1212 on the back, and one microphone 1206 on or near a top or side of the device. In some devices there may be only one microphone, while in other devices there might be at least one microphone on each side and/or corner of the device, or in other appropriate locations.

The device 1200 in this example also includes one or more orientation- or position-determining elements 1218 operable to provide information such as a position, direction, motion, or orientation of the device. These elements can include, for example, accelerometers, inertial sensors, electronic gyroscopes, and electronic compasses.

The example device also includes at least one communication mechanism 1214, such as may include at least one wired or wireless component operable to communicate with one or more electronic devices. The device also includes a power system 1216, such as may include a battery operable to be recharged through conventional plug-in approaches, or through other approaches such as capacitive charging through proximity with a power mat or other such device. Various other elements and/or combinations are possible as well within the scope of various embodiments.

Figure 13:
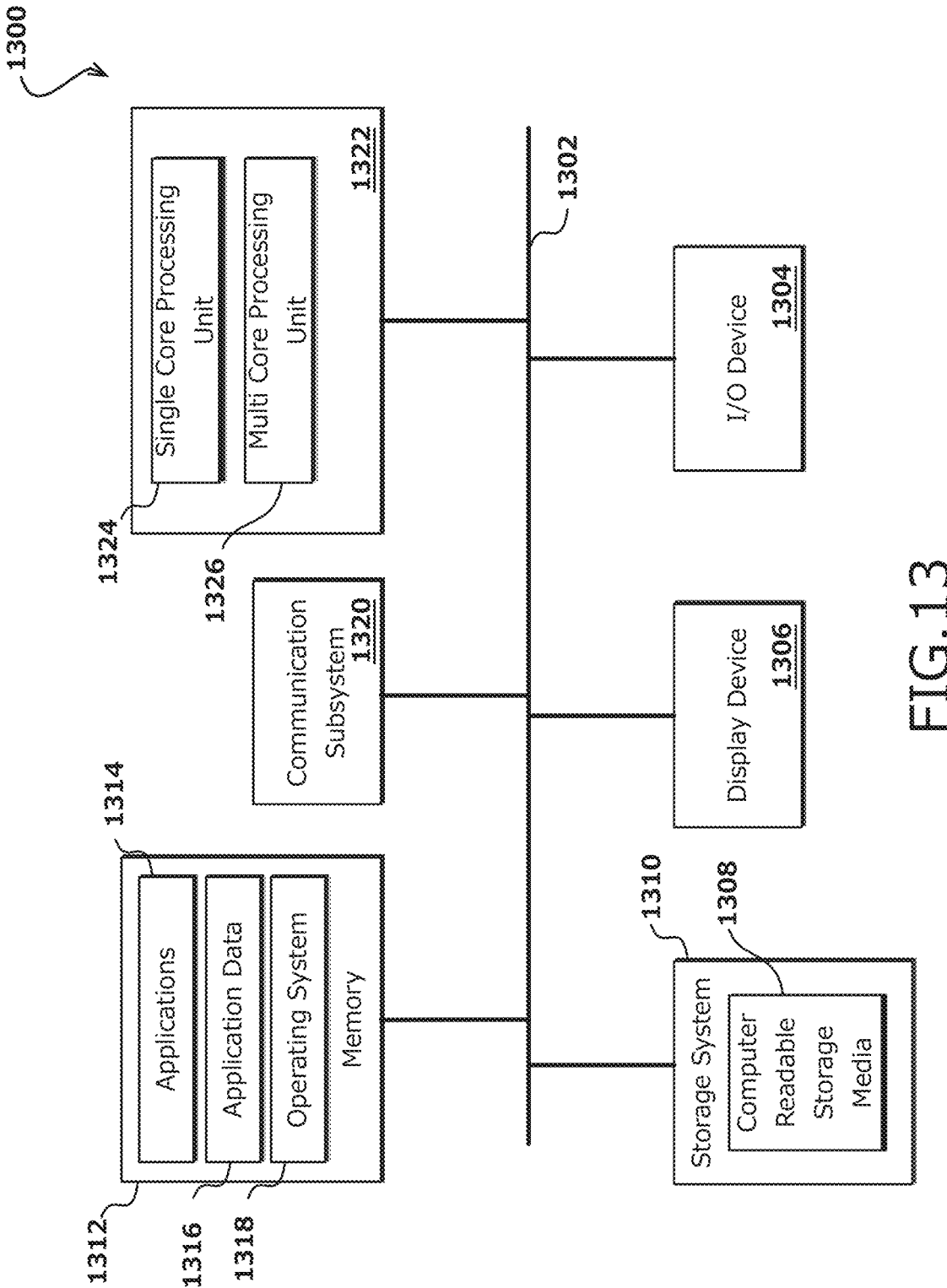
FIG. 13 illustrates an example configuration of components of a device such as that described with respect to FIGS. 12A and 12B.

FIG. 13 illustrates a set of basic components of an electronic computing device 1200 such as the device 1200 described with respect to FIGS. 12A and 12B. In various embodiments, computer system 1300 may be used to implement any of the systems, devices, or methods described herein. In some embodiments, computer system 1300 may correspond to any of the various devices described herein, including, but not limited, to mobile devices, tablet computing devices, wearable devices, personal or laptop computers, vehicle-based computing devices, or other devices or systems described herein. As shown in FIG. 13, computer system 1300 can include various subsystems connected by a bus 1302. The subsystems may include an I/O device subsystem 1304, a display device subsystem 1306, and a storage subsystem 1310 including one or more computer-readable storage media 1308. The subsystems may also include a memory subsystem 1312, a communication subsystem 1320, and a processing subsystem 1322.

In system 1300, bus 1302 facilitates communication between the various subsystems. Although a single bus 1302 is shown, alternative bus configurations may also be used. Bus 1302 may include any bus or other components to facilitate such communication as is known to one of ordinary skill in the art. Examples of such bus systems may include a local bus, parallel bus, serial bus, bus network, and/or multiple bus systems coordinated by a bus controller. Bus 1302 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1304 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1304 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1300 may include a display device subsystem 1306. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1306 may include a controller and/or interface for controlling and/or communicating with an external display, such as any of the above-mentioned display technologies.

As shown in FIG. 13, system 1300 may include storage subsystem 1310 including various computer-readable storage media 1308, such as hard disk drives, solid-state drives (including RAM-based and/or flash-based SSDs), or other storage devices. In various embodiments, computer-readable storage media 1308 can be configured to store software, including programs, code, or other instructions, that is executable by a processor to provide the functionality described herein. For example, the instructions, when executed, can enable a computing device to perform automated document negotiation in accordance with the present disclosure may be embodied on a computer-readable medium. This may include automatically obtaining information from parties seeking to negotiate document sections of a document such as a contract; generating a ranking value or other such document selection value or score for a plurality of candidate contracts possible between the parties based on information from the parties, including their preferences and priority information for different sections (e.g., provisions) of the contract; and using the document section ranking values to optimize an optimization function (e.g., a cost function or other such function) to determine ranking values for the plurality of candidate contracts to determine a document or document information that satisfies constraints of the parties.

In some embodiments, storage system 1310 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1310 can include a media reader, card reader, or other storage interfaces to communicate with one or more external and/or removable storage devices. In various embodiments, computer-readable storage media 1308 can include any appropriate storage medium or combination of storage media. For example, computer-readable storage media 1308 can include, but is not limited to, any one or more of random access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 1312 can include various types of memory, including RAM, ROM, flash memory, or other memory. Memory 1312 can include SRAM (static RAM) or DRAM (dynamic RAM). In some embodiments, memory 1312 can include a BIOS (basic input/output system) or other firmware configured to manage initialization of various components during, e.g., startup. As shown in FIG. 13, memory 1312 can include applications 1314 and application data 1316. Applications 1314 may include programs, code, or other instructions, that can be executed by a processor. Applications 1314 can include various applications such as browser clients, campaign management applications, data management applications, and any other application. Application data 1316 can include any data produced and/or consumed by applications 1314. Memory 1312 can additionally include operating system 1318, such as macOS®, Windows®, Linux®, various UNIX® or UNIX- or Linux-based operating systems, or other operating systems.

System 1300 can also include a communication subsystem 1320 configured to facilitate communication between system 1300 and various external computer systems and/or networks (such as the Internet, a local area network (LAN), a wide area network (WAN), a mobile network, or any other network). Communication subsystem 1320 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally, or alternatively, communication subsystem 1320 can include hardware and/or software components to communicate with satellite-based or ground-based location services, such as GPS (global positioning system). In some embodiments, communication subsystem 1320 may include, or interface with, various hardware or software sensors. The sensors may be configured to provide continuous or and/or periodic data or data streams to a computer system through communication subsystem 1320

As shown in FIG. 13, processing system 1322 can include one or more processors or other devices operable to control computing system 1300. Such processors can include single-core processors 1324, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 1322, such as processors 1324 and 1326, may be used independently or in combination depending on the application.

Various other configurations may be used with particular elements that are depicted as being implemented in hardware may instead be implemented in software, firmware, or a combination thereof. One of ordinary skill in the art will recognize various alternatives to the specific embodiments described herein.

Figure 14:
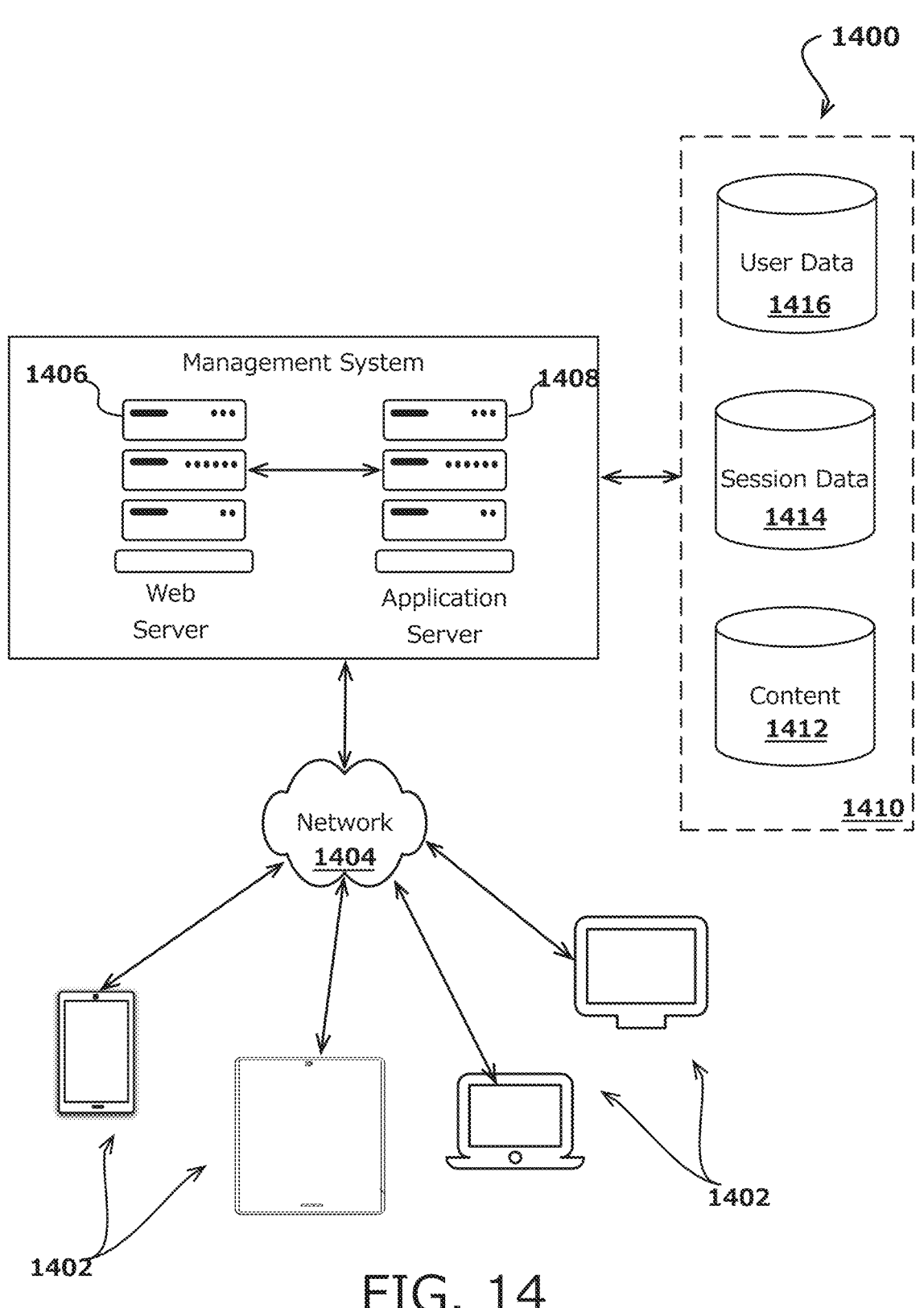
FIG. 14 illustrates an example of an environment for implementing aspects in accordance with various embodiments.

FIG. 14 illustrates an example of an environment 1400 for implementing aspects in accordance with various embodiments. As will be appreciated, although a Web-based environment is used for purposes of explanation, different environments may be used, as appropriate, to implement various embodiments. The environment includes electronic client devices 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like.

The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device and handling a majority of the data access and business logic for an application. The application server provides access control services in cooperation with the data store and can generate content such as text, graphics, audio and/or video to be transferred to the user, which may be served to the user by the Web server 1406 in the form of HTML, XML or another appropriate structured language in this example. The handling of all requests and responses, as well as the delivery of content between the client device 1402 and the application server 1408, can be handled by the Web server 1406. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing content (e.g., production data) 1412 and user information 1416, which can be used to serve content for the production side. The data store is also shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

An environment such as that illustrated in FIG. 14 can be useful for a provider of document negotiation services who might wish to generate or otherwise determine a document (e.g., a contract) or document information that satisfies constraints of at least one party in a negotiation.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Having been provided with the description and illustration of the present application, one skilled in the art may envision variations, modifications, and alternate embodiments falling within the general inventive concept discussed in this application that do not depart from the scope of the following claims.

What is claimed is:

1. A computing system, comprising:
at least one computing processor; and
memory including instructions that, when executed by the at least one computing processor, enable the computing system to:
obtain preference data associated with a primary account, the preference data specifying value ranges for a plurality of contract terms,
obtain a set of contract terms and a set of contract term values from a secondary account,
apply a computational value function to optimize at least one performance metric associated with the primary account based on the preference data and the plurality of contract terms to generate optimized contract term values, wherein the computational value function employs a multi-factor optimization algorithm that incorporates weighted criteria associated with the at least one performance metric, and wherein the multi-factor optimization algorithm uses at least one of linear programming or machine learning techniques to predict and dynamically adjust the optimized contract term values in response to contractual requirements; and
present the optimized contract term values to facilitate real-time negotiation adjustments.

2. The computing system of claim 1, wherein the at least one performance metric includes one or more of profitability, time efficiency, or contractual compliance.

3. The computing system of claim 1, wherein preference data includes data selected from at least one of payment terms, delivery terms, warranty conditions, or dispute resolution methods.

4. The computing system of claim 1, wherein the memory further includes instructions that, when executed by the at least one computing processor, enable the computing system to:
compare the optimized contract term values against historical contract performance data to iteratively refine optimization of the at least one performance metric.

5. The computing system of claim 1, wherein the memory further includes instructions that, when executed by the at least one computing processor, enable the computing system to:
receive user feedback on the optimized contract term values and adjust the computational value function based on the user feedback.

6. The computing system of claim 1, wherein the computational value function utilizes machine learning techniques to adaptively modify the set of contract term values based on ongoing contract negotiations.

7. The computing system of claim 1, wherein the set of contract terms includes a plurality of contract terms selected from at least a price contract term, an item quantity contract term, a delivery time contract term, a payment date contract term, or an item quality guarantee contract term.

8. The computing system of claim 1, further comprising a user interface configured to display the optimized contract term values alongside original contract terms values to facilitate direct comparison.

9. The computing system of claim 1, wherein the primary account is associated with a company, and wherein the secondary account is associated with one of a supplier or a vendor negotiating with the company.

10. The computing system of claim 1, wherein the secondary account is associated with a secondary user account document section preference data, the computing system further configured to reconcile differences between primary account preference data and secondary user account preference data.

11. A method for negotiating contract terms in a computing environment, the method comprising:
obtaining preference data specifying value ranges for multiple contract terms associated with a primary account;
obtaining a set of contract terms and their values from a secondary account;
applying a computational value function to optimize at least one performance metric based on the preference data and the set of contract terms to generate optimized contract term values,
wherein the computational value function employs a multi-factor optimization algorithm that incorporates weighted criteria based on the at least one performance metric, and wherein the multi-factor optimization algorithm uses at least one of linear programming or machine learning techniques to predict and dynamically adjust the optimized contract term values in response to contractual requirements; and
presenting the optimized contract term values to facilitate real-time negotiation adjustments.

12. The method of claim 11, wherein the at least one performance metric includes at least one of profitability, time efficiency, or compliance with contractual obligations.

13. The method of claim 11, wherein the preference data includes specifications for at least one of payment terms, delivery terms, warranty conditions, or dispute resolution methods.

14. The method of claim 11, further comprising:

comparing the optimized contract term values against historical contract performance data to iteratively refine optimization of the at least one performance metric.

15. The method of claim 11, further comprising:

receiving user feedback on the optimized contract term values and adjusting the computational value function based on the user feedback.

16. A non-transitory computer-readable storage medium storing instructions that, when executed, cause a computing system to perform a method for negotiating contract terms, the method comprising:

obtaining preference data specifying value ranges for multiple contract terms associated with a primary account;

obtaining a set of contract terms and their values from a secondary account;

applying a computational value function to optimize at least one performance metric based on the preference data and the set of contract terms to generate optimized contract term values, wherein the computational value function employs a multi-factor optimization algorithm that incorporates weighted criteria based on the at least one performance metric, and wherein the multi-factor optimization algorithm uses at least one of linear programming or machine learning techniques to predict and dynamically adjust the optimized contract term values in response to contractual requirements; and presenting the optimized contract term values to facilitate real-time negotiation adjustments.

17. The non-transitory computer-readable storage medium of claim 16, wherein the at least one performance metric includes at least one of profitability, time efficiency, or compliance with contractual obligations.

18. The non-transitory computer-readable storage medium of claim 16, wherein the preference data includes specifications for at least one of payment terms, delivery terms, warranty conditions, or dispute resolution methods.

19. The non-transitory computer-readable storage medium of claim 16, further comprising instructions that, when executed, cause the computing system to:

compare the optimized contract term values against historical contract performance data to iteratively refine optimization of the at least one performance metric.

20. The non-transitory computer-readable storage medium of claim 16, further comprising instructions that, when executed, cause the computing system to:

receive user feedback on the optimized contract term values and adjust the computational value function based on the user feedback.

* * * * *